US006846153B2

(12) United States Patent
Schiesser et al.

(10) Patent No.: US 6,846,153 B2
(45) Date of Patent: Jan. 25, 2005

(54) TRAY DESTACKER

(75) Inventors: Ricardo N. Schiesser, Rockford, MI (US); Robert L. Stone, Rockford, MI (US); Jeffrey D. Price, Grand Rapids, MI (US); Charles R. DeVries, Grand Rapids, MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 148 days.

(21) Appl. No.: 10/095,829

(22) Filed: Mar. 12, 2002

(65) Prior Publication Data

US 2002/0131856 A1 Sep. 19, 2002

Related U.S. Application Data

(60) Provisional application No. 60/275,789, filed on Mar. 14, 2001, and provisional application No. 60/297,516, filed on Jun. 12, 2001.

(51) Int. Cl.[7] .............................................. B65G 59/10
(52) U.S. Cl. ............................... 414/798.9; 414/798.1; 414/796.4; 414/795.8; 414/795.6
(58) Field of Search .......................... 414/798.9, 798.1, 414/796.9, 796.4, 795.8, 795.6

(56) References Cited

U.S. PATENT DOCUMENTS

| 4,242,029 A | * | 12/1980 | Musgrave | ............ 414/798.9 X |
|---|---|---|---|---|
| 4,809,881 A | * | 3/1989 | Becker | ................ 414/795.6 X |
| 4,909,412 A | * | 3/1990 | Cerf | .................... 414/795.6 X |
| 4,915,578 A | * | 4/1990 | Becker | ................ 414/795.6 X |
| 5,013,213 A | | 5/1991 | Roberts et al. | .......... 414/798.9 |
| 5,791,867 A | * | 8/1998 | Kuhl | .................... 414/796.9 X |
| 5,959,868 A | | 9/1999 | Oppliger et al. | ....... 364/478.14 |

FOREIGN PATENT DOCUMENTS

| EP | 0774303 | 5/1997 |
|---|---|---|
| WO | WO 9941172 | 8/1999 |
| WO | WO 0053344 | 9/2000 |
| WO | WO 0112348 | 2/2001 |

* cited by examiner

Primary Examiner—Donald W. Underwood
(74) Attorney, Agent, or Firm—Van Dyke, Gardner, Linn & Burkhart, LLP

(57) ABSTRACT

A tray destacker is operable to separate individual trays from a stack of trays and to discharge the individual trays. The tray destacker includes a tray separating device which engages an edge or handle of the individual tray and moves the tray away from the stack of trays, while a tray retaining device engages a next tray adjacent to the individual tray and retains the remaining trays of the stack. The tray separating device may be biased toward an engaging position so as to engage the individual tray when the trays and the tray separating device are in an appropriate position relative to one another. The tray retaining device may also be biased to engage the next tray and may release the next tray in response to the tray separating device returning to the stack of trays to remove the next tray from the stack.

58 Claims, 19 Drawing Sheets

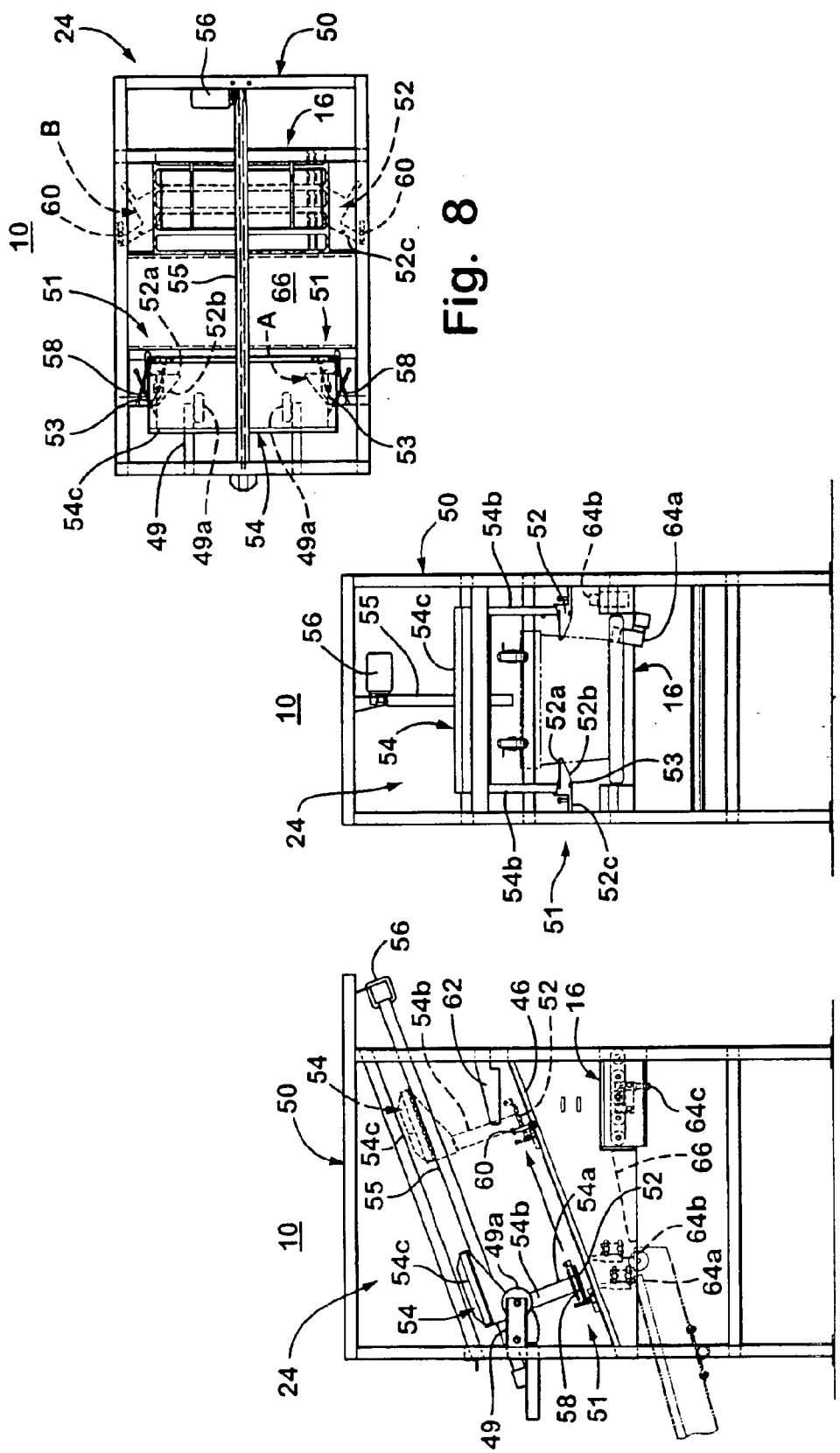

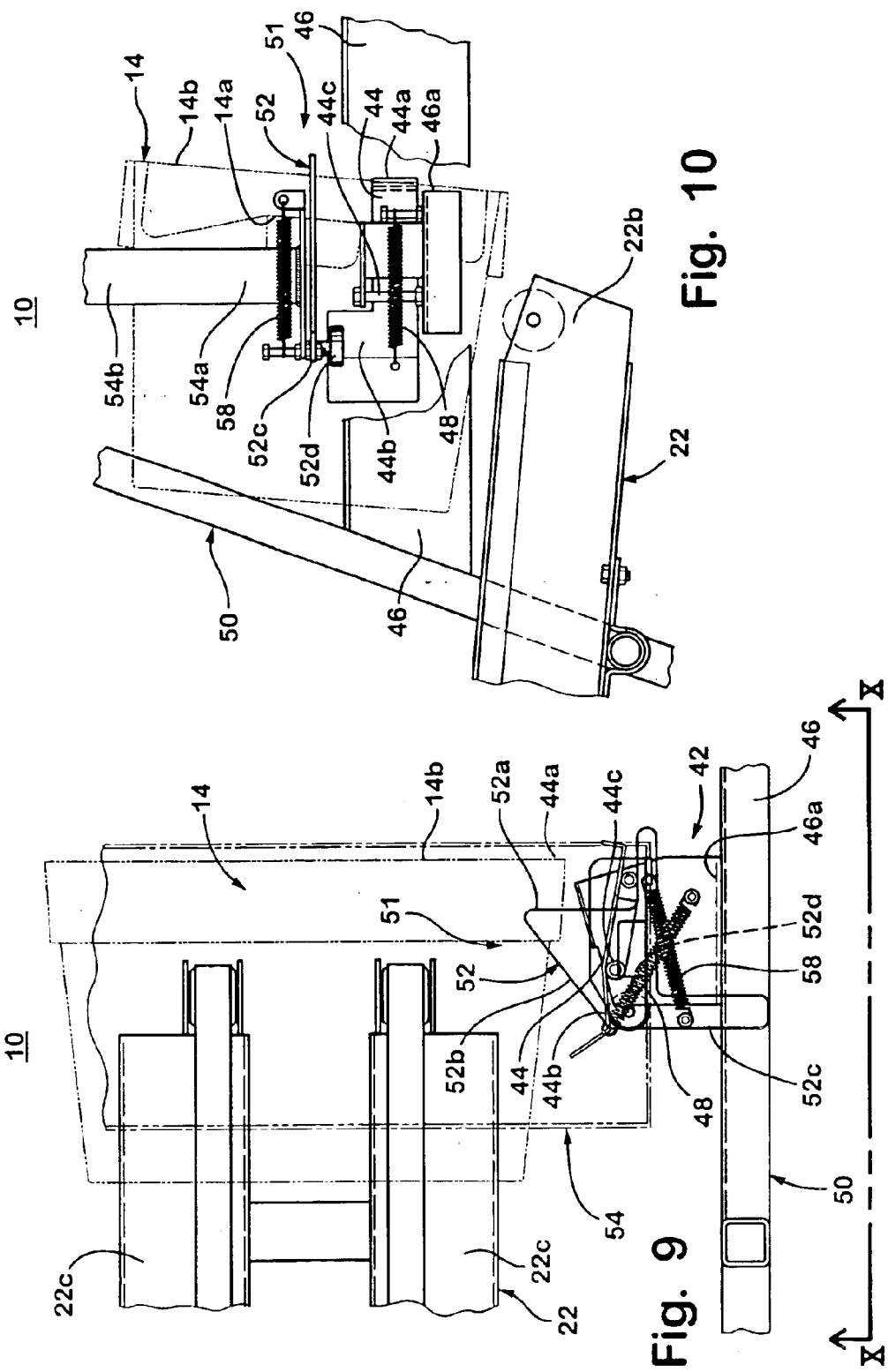

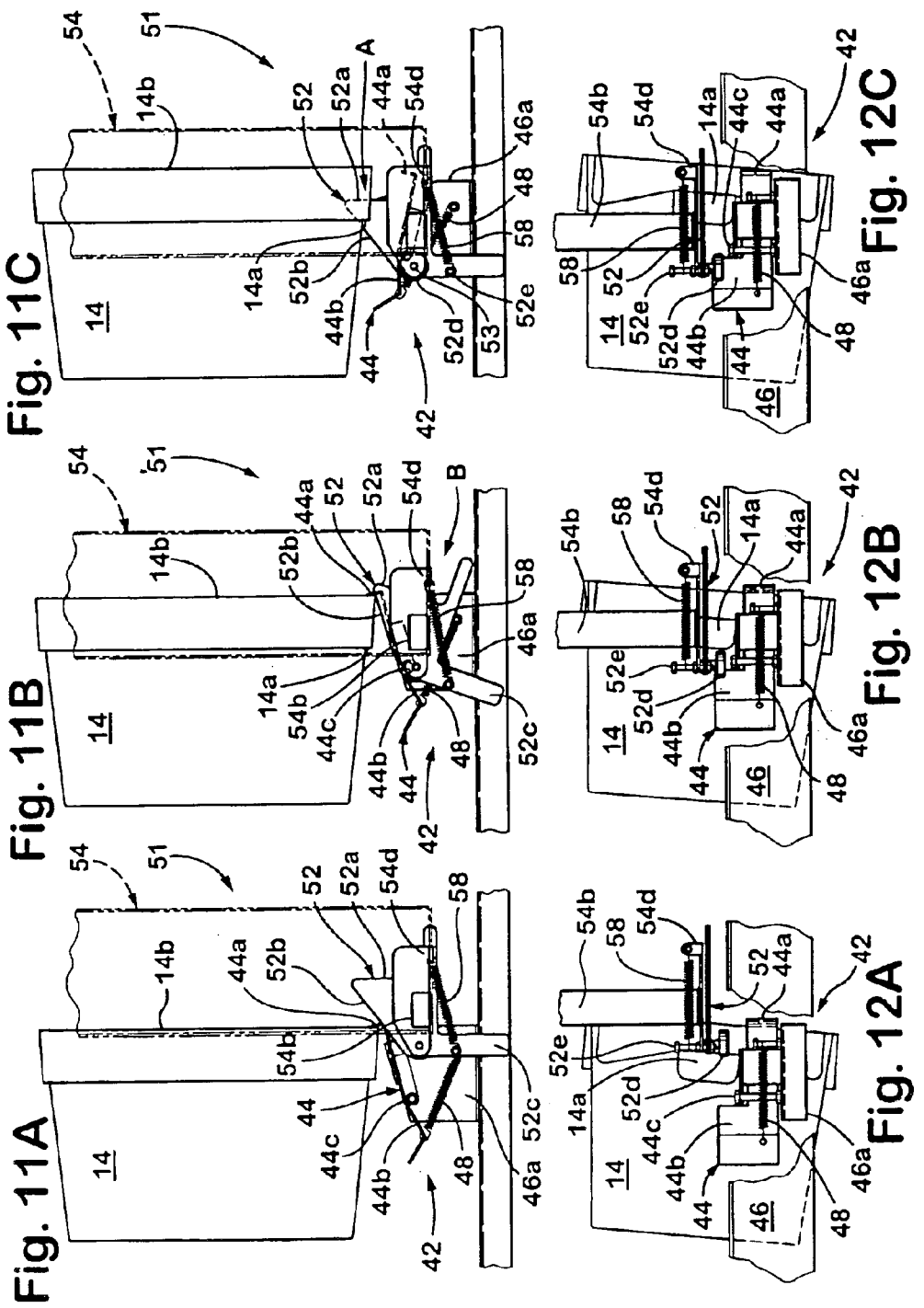

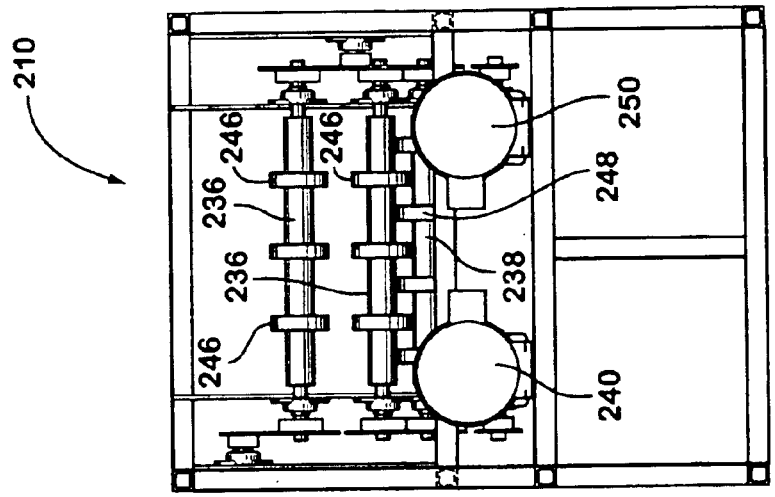
Fig. 21
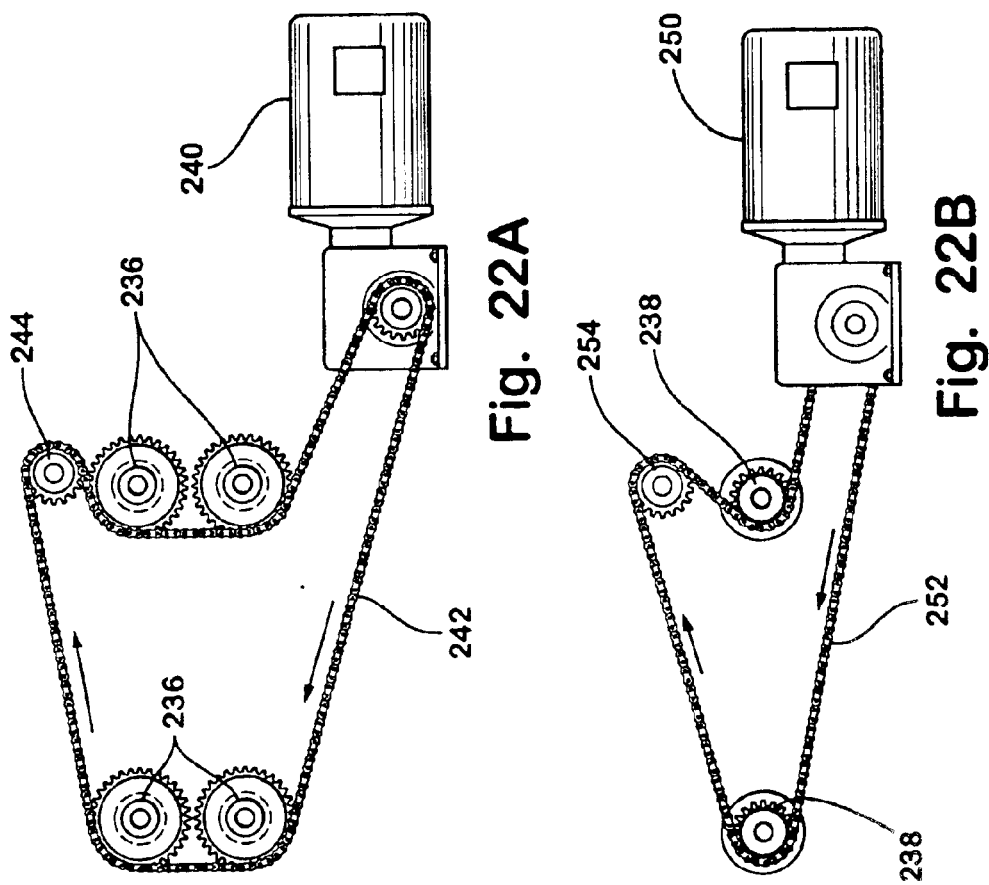
Fig. 22A
Fig. 22B

TRAY DESTACKER

CROSS-REFERENCE TO RELATED APPLICATIONS

This application claims priority on U.S. provisional application, Ser. No. 60/275,789, filed Mar. 14, 2001 by Schiesser et al. for TRAY DESTACKER, and U.S. provisional application, Ser. No. 60/297,516, filed Jun. 12, 2001 by Schiesser et al. for TRAY DESTACKER, which are hereby incorporated herein by reference in their entireties.

FIELD OF THE INVENTION

The present invention relates generally to tray handling systems, such as for sortation systems and, more particularly, to a mechanism for automatically separating and destacking individual trays from stacks of empty trays, such as for induction of the individual empty trays onto a tray handling system.

BACKGROUND OF THE INVENTION

Typically, empty trays are manually inducted into a sorting machine or into a tray management system. The trays may be provided from trucks, carts or other sources and manually separated and inducted into a machine or tray management system by an operator. In order to minimize the manual processes, robotic tray separating devices have been proposed. However, such robotic devices are expensive and slow, and require protective caging, which takes up additional floor space.

A device for unstacking rigid containers has been proposed which pulls an individual tray from an end of a horizontally oriented stack of trays. The proposed device includes lateral pressure cylinders which function to pivot as a pair of clamping devices onto the side of the container. The clamping devices squeeze or clamp the container therebetween to grasp the container. Therefore, the proposed device is applicable only for rigid containers which have sufficient structural integrity to withstand the lateral pressure at the sides of the container. Also, the proposed device is costly to manufacture and maintain due to the pressure cylinders.

Therefore, there is a need in the art for an efficient, low cost means for separating and destacking individual trays from stacks of empty trays for inducting the empty trays one at a time into a sorting machine or a tray management or handling system, or any other device or system which receives singulated trays at an induct thereof.

SUMMARY OF THE INVENTION

The present invention is intended to provide a tray destacker which is operable to separate individual trays from a stack of trays provided to the tray destacker. The tray destacker of the present invention is operable to automatically separate and discharge individual trays from the stack of trays. The tray destacker of the present invention is suitable for separating and discharging individual trays at an induct end of a tray handling system or tray management system of a sortation assembly.

According to an aspect of the present invention, a tray destacker for destacking an individual tray from a stack of at least partially nested trays includes a tray supporting device, which supports a stack of at least partially nested trays and a tray separating device. Each of the trays has a first engaging portion and a second engaging portion. The tray separating device is operable to separate and discharge individual trays from the stack of trays. The tray separating device is movable between an engaging position for engaging the first engaging portion of an individual tray of the stack of trays and a disengaging position remote from the first engaging portion of the trays supported by the tray supporting device. The separating device is biased toward the engaging position by a biasing member and is movable to the engaging position when generally aligned with the first engaging portion of the individual tray to be destacked. The tray separating device is operable to engage the first engaging portion of the individual tray and to exert a force at the first engaging portion generally in a separating direction generally along the stack of trays.

Preferably, the tray destacker includes a tray retaining device which retains the stack of trays on the supporting device as the tray separating device separates the individual tray from the stack. The tray retaining device is movable between a retaining position where the tray retaining device engages the second engaging portion of a tray of the stack of trays and a released position where the tray retaining device is remote from the second engaging portion of the trays supported by the tray supporting device. The stack of trays may be movable by the tray separating device or the tray support device when the tray retraining device is in its released position. The tray retaining device is biased toward the retaining position by a second biasing member. The tray retaining device is movable to the retaining position to engage the second engaging portion of a next tray adjacent to the individual tray when the tray separating device moves the individual tray in the separating direction.

The tray separating device thus moves to separate the individual tray from the stack of trays, while the tray retaining device restrains the remaining trays in the stack of trays to substantially preclude the tray destacker from separating and destacking more than one tray at a time.

The tray separating device preferably includes a separating member which is pivotable and movable between the tray support device and a takeaway conveyor or the like, while the tray retaining device may be pivotably mounted at the tray support device. The tray separating member may be movable into alignment with the first engaging portion of the individual tray. Preferably, the tray separating device functions to pivot the tray retaining device to its released position as the separating member moves toward its aligned position. The tray retaining device then pivots back to its retaining position in response to the second biasing member as the separating member, along with the individual tray being separated and destacked from the stack of trays, moves away from the stack of trays.

According to another aspect of the present invention, a tray destacking device for destacking an individual tray from a stack of at least partially nested trays includes a tray supporting device and a tray separating device. The stack of trays define a stack direction, and each of the trays has a first engaging portion generally within a first plane which is generally normal to the stack direction and a second engaging portion generally within a second plane which is generally normal to the stack direction. The tray separating device is operable to separate and discharge an individual tray from the stack of trays by engaging the first engaging portion of an individual tray and exerting a force at the first engaging portion generally in the stack direction.

Preferably, the tray destacking device includes a tray retaining device which selectively retains the stack of trays on the tray supporting device as the tray separating device separates the individual tray from the stack of trays. The tray retaining device is movable to a retaining position to engage the second engaging portion of a next adjacent tray which is adjacent to the individual tray when the tray separating device moves the individual tray in the separating direction.

In one form, the tray destacker is operable to tilt or lower a stack of trays onto an inclined support or conveyor and to separate and destack individual trays from the inclined stack of trays. The separated individual trays may be moved by the tray destacker and placed onto a takeaway conveyor or the like. The tray destacker may include a tilting mechanism to tilt or lower the stack of trays onto the inclined support.

In another form, the tray supporting device is operable to support the stack of trays in a generally vertical orientation. The separating device may release and discharge the bottom tray of the stack of trays. Alternately, the tray separating device may release and discharge the top tray of the stack of trays.

The tray separating device may include at least one separating finger which is movable in a generally continuous loop to engage, separate and discharge an individual tray from the stack and then to move back to engage, separate and discharge another tray from the stack. The tray retaining device likewise may include at least two retaining fingers which are movable in a generally continuous loop to retain and release the remaining trays in the stack as the tray separating device separates each end individual trays.

According to yet another aspect of the present invention, a tray destacking device for destacking an individual tray from a stack of at least partially nested trays includes a tray retaining device and a tray separating device. Each of the trays in the stack of trays has opposite outer surfaces. The tray retaining device includes at least two rollers which are adapted to frictionally engage the opposite side surfaces of the trays of the stack of trays. The tray separating device includes at least one roller which is configured to engage at least one side surface of an individual tray at an end of the stack of trays. The roller of the tray separating device is rotatable in a first direction to cause movement of the individual tray away from the stack of trays. The rollers of the tray retaining device frictionally retain the stack of trays as the tray separating device separates and discharges the individual tray from the stack of trays.

The rollers of the tray retaining device may be rotatable in the first direction to move the stack of trays to an appropriate position for the roller of the tray separating device to engage and separate the next tray from the stack of trays. The rollers of the tray retaining device may also be rotatable in a second direction to further resist movement of the stack of trays in response to the tray separating device separating the individual tray from the stack of trays. The second direction is opposite to the first direction.

These and other objects, purposes, features and advantages of the present invention will become apparent upon review of the specification in conjunction with the drawings.

BRIEF DESCRIPTION OF THE DRAWINGS

FIG. 6 is a side elevation of a tray destacking device in accordance with the present invention;

FIG. 7 is an end elevation of the tray destacking device of FIG. 6;

FIG. 8 is a top plan view of the tray destacking device of FIGS. 6 and 7;

FIG. 9 is an enlarged top plan view of the tray destacking device, showing a tray separating device and a tray retaining device useful with the present invention, as positioned at one side of a tray;

FIG. 10 is a side elevation of the tray separating device and tray retaining device of FIG. 9;

FIGS. 11A–11C are top plan views similar to FIG. 9 and show different stages as the tray separating device engages an individual tray;

FIGS. 12A–12C are side elevations similar to FIG. 10 and show the different stages of FIGS. 11A–C;

FIG. 21 is an end elevation of the tray destacker of FIGS. 19 and 20; and

FIGS. 22A and 22B are side elevations of the two roller drive systems useful with the tray destacker of FIGS. 19–21.

DESCRIPTION OF THE PREFERRED EMBODIMENTS

Figure 1:
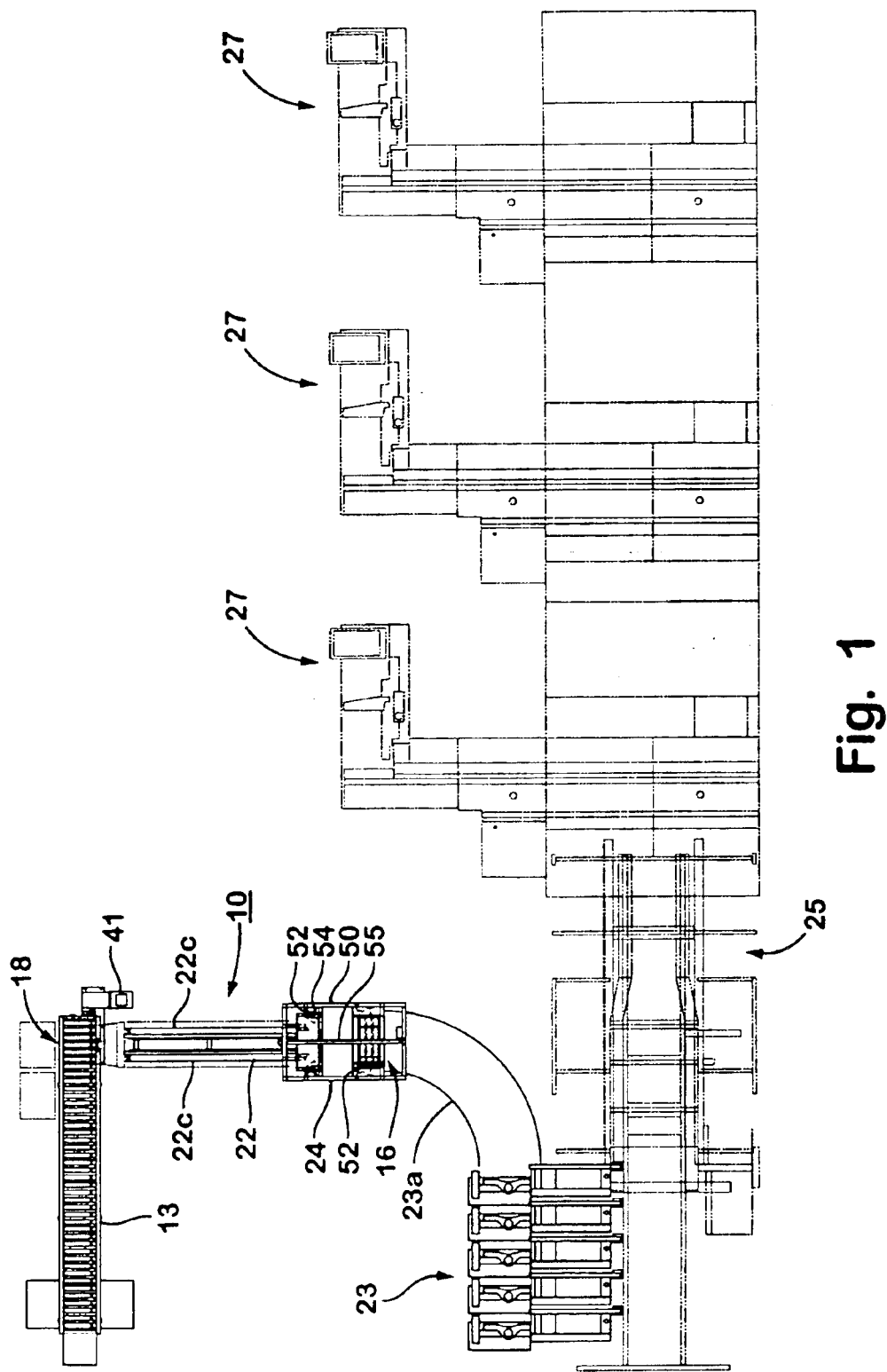
FIG. 1 is a top plan view of a tray destacker in accordance with the present invention positioned at an induct end of a tray handling system at a sortation assembly.
Figure 2:
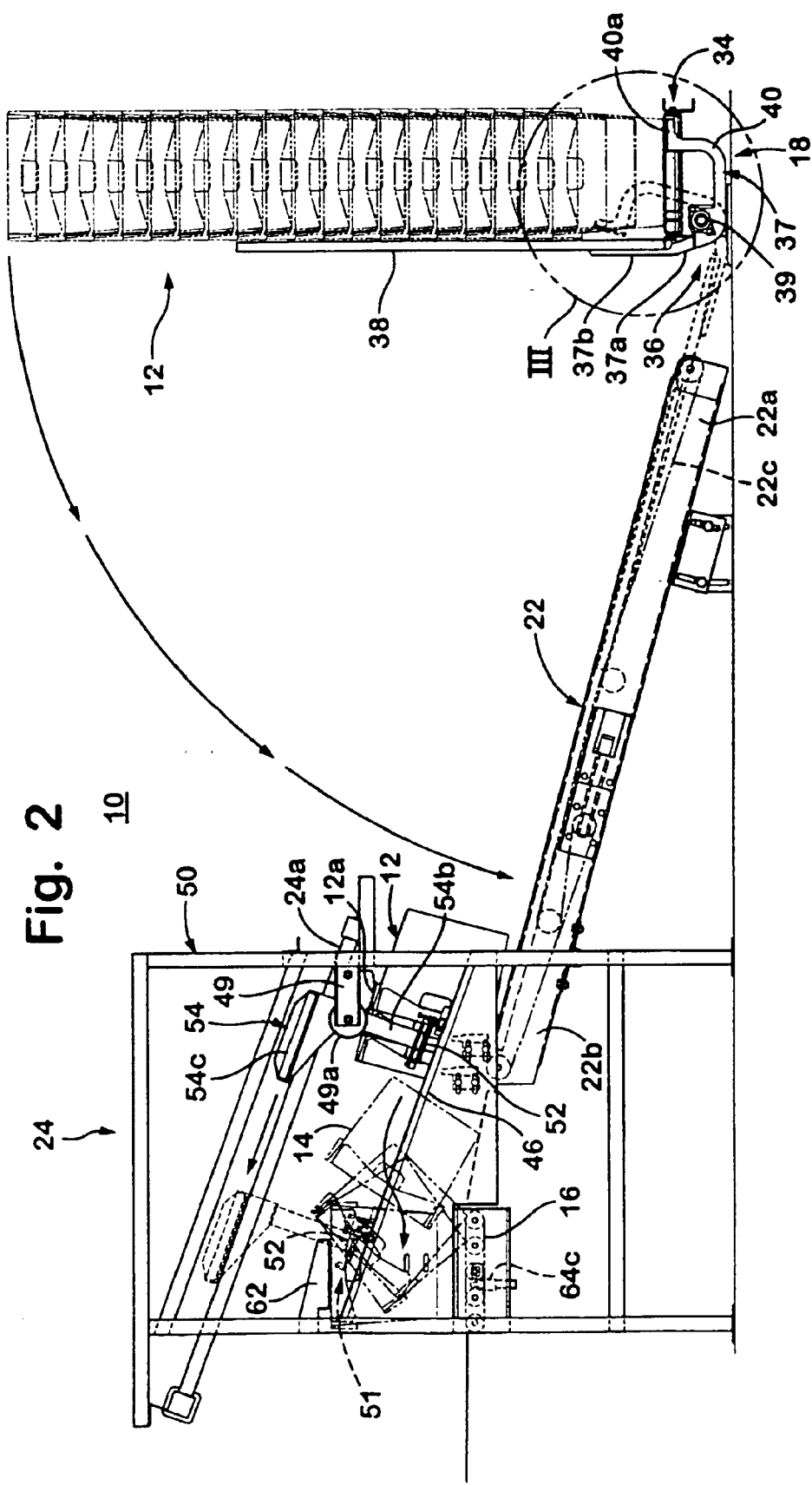
FIG. 2 is a side elevation of the tray destacker of FIG. 1.

Referring now specifically to the drawings and the illustrative embodiments depicted therein, a tray destacker or tray destacking mechanism or apparatus 10 is operable to separate and unstack or destack individual trays 14 from a stack of empty trays 12 and discharge the individual empty trays 14 at a platform or feed conveyor 16 (FIGS. 1 and 2). The tray destacker 10 is thus operable to automatically separate or singulate individual trays from a stack of trays and discharge the individual trays for use with various tray handling or tray management systems. For example, the tray destacker 10 may be implemented at an induct conveyor 23a of a tray handling system 23 for an article sortation machine 25. As shown in FIGS. 2–5, tray destacker 10 includes a tilt station 18, which is operable to tilt or lower a stack of trays 12 onto an inclined tray supporting device or a tray support or conveyor 22 positioned between tilt station 18 and feed conveyor 16. Tray destacker 10 also includes a tray separator or separating device 24 which is operable to engage, separate and pull a top or end individual tray 14 from the stack of trays 12 on inclined conveyor 22 and to move the separated tray 14 from the stack onto the takeaway or feed conveyor or platform 16, where the singulated trays are then inducted onto induct conveyor 23a of the tray handling system 23, as discussed below.

Figure 13A:
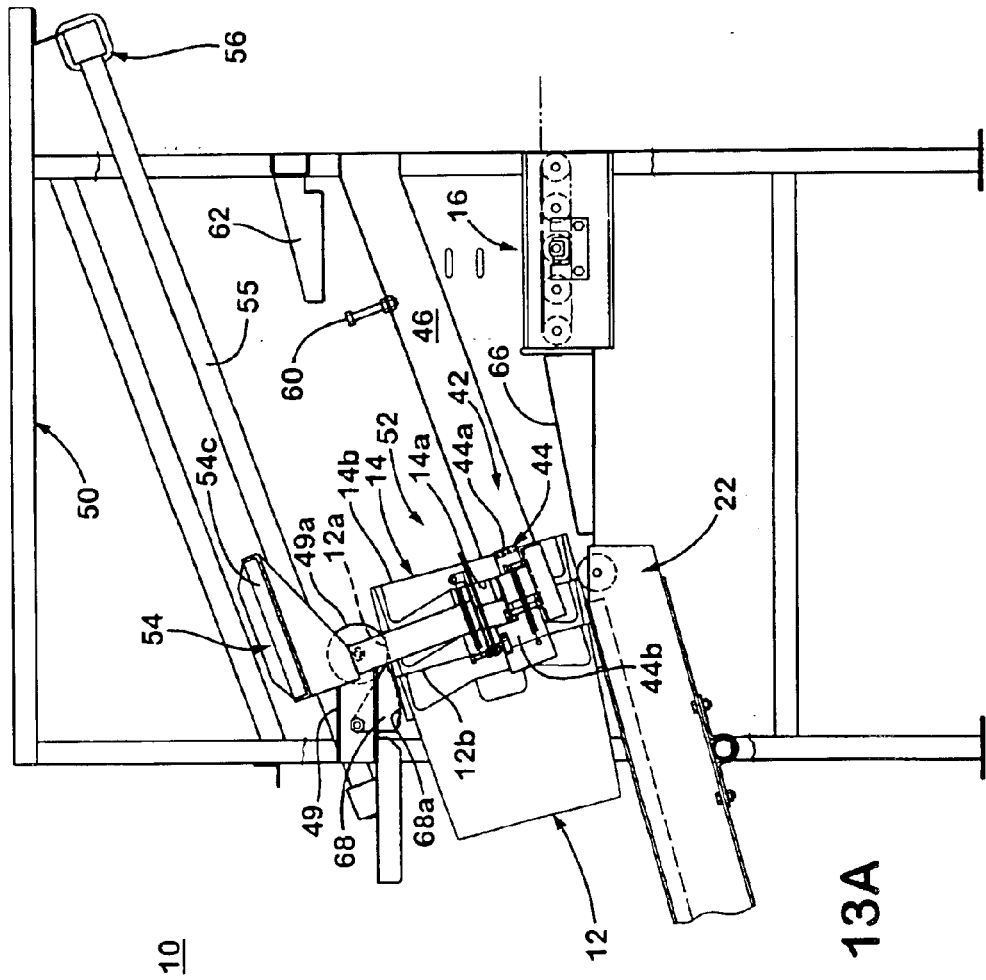
FIGS. 13A–13C are side elevations similar to FIG. 6 and show different stages as the tray separating device engages the tray, separates the tray from the stack of trays, and moves the tray to a platform or takeaway conveyor.
Figure 13B:
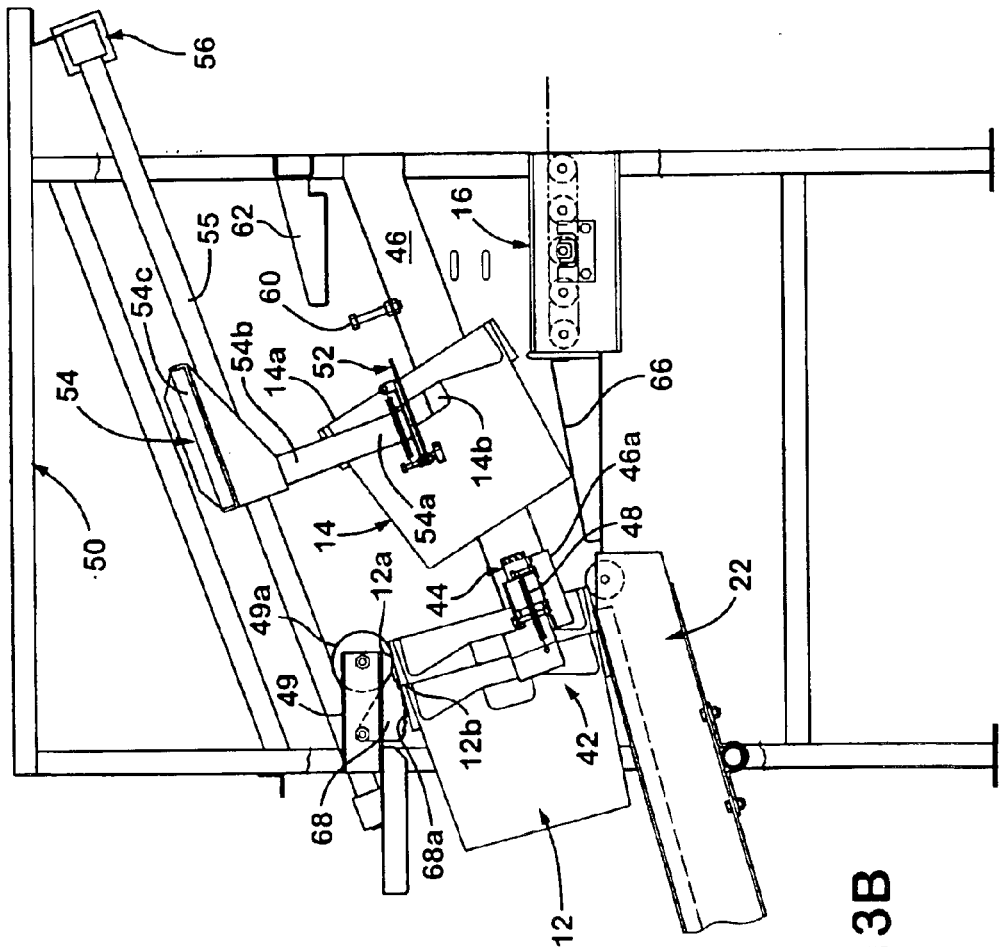
Figure 13C:
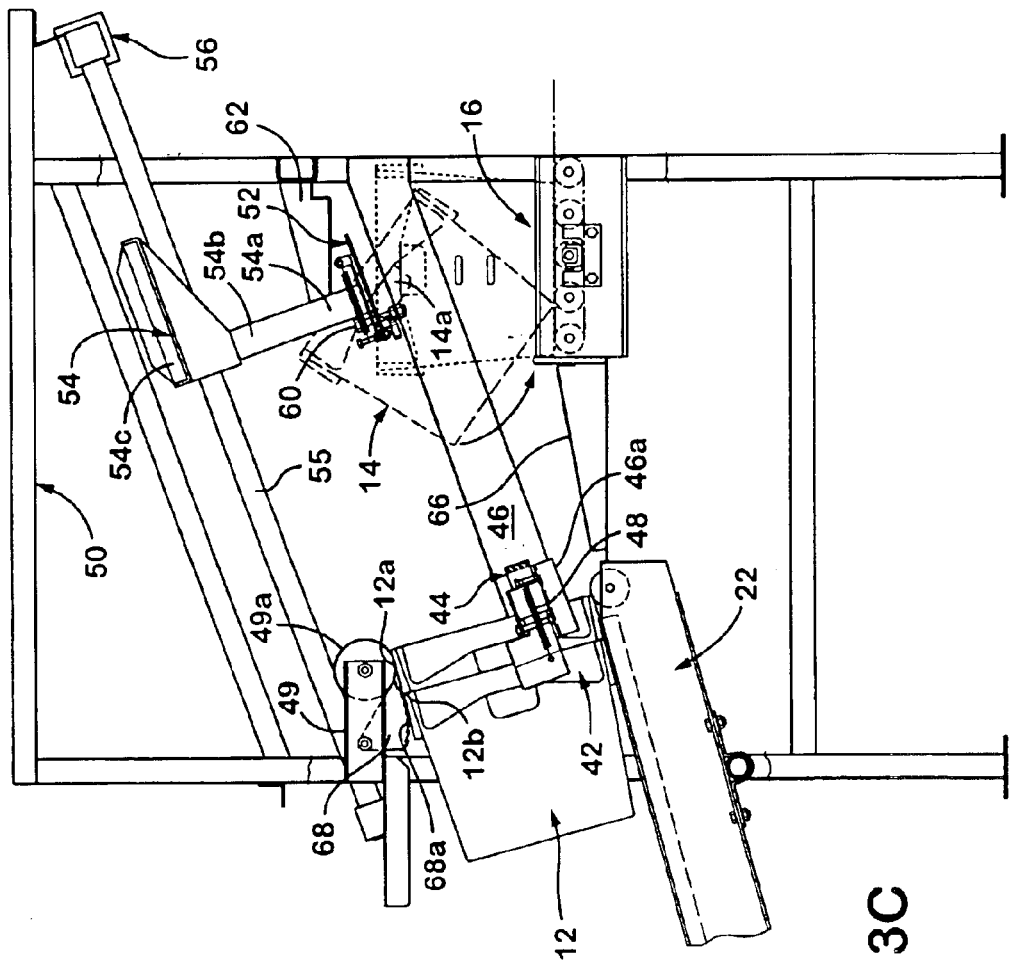

Tray destacker 10 is operable to separate and destack conventional mail trays 14, each of which includes a handle portion 14a and an upper edge 14b and nests within the next lower or adjacent tray of the stack of trays 12. The stack of trays define a stack direction, such as vertical in FIG. 5 or along the incline of the support conveyor 22 in FIG. 2. The handle portion 14a of tray 14 is positioned generally along a plane which is generally normal to the stack direction, while the upper edge 14b is also positioned generally along another plane which is also generally normal to the stack direction. For example, in FIG. 5, the stack direction of the trays is generally vertical, with the handle portion 14a being generally horizontal and the upper edge 14b being generally horizontal. Also, as shown in FIGS. 13A–C, the stack direction is along the inclined conveyor 22 with the handle portions and upper edge of the trays being oriented generally normal to the inclined conveyor 22. Tray destacker 10 is operable to engage the handle portion or the upper edge of the trays to move or restrain the trays during the destacking process, as discussed in detail below.

Induct conveyor 23a of tray handling system 23 may be a powered roller conveyor, such as a curved powered roller conveyor (as shown in FIG. 1), or a belt conveyor, or any other conveying means, which is generally in line with the automatic tray handling system, such as in line with the powered roller delivery and takeaway sections of the tray handling system 23. Tray handling system 23 may be any type of conveying or transporting system for moving trays to a sortation machine, such as a tray handling system of one of the types disclosed in commonly assigned U.S. patent applications, Ser. No. 09/629,009, filed Jul. 31, 2000 by Olson et al. for AUTOMATIC TRAY HANDLING SYSTEM FOR SORTER, now U.S. Pat. No. 6,561,339 (Attorney Docket RAP04 P-601); or Ser. No. 09/831,068, filed May 4, 2001 by Kalm et al. for AUTOMATIC TRAY HANDLING SYSTEM FOR SORTER, now U.S. Pat. No. 6,561,360 (Attorney Docket RAP04 P-580A), which are hereby incorporated herein by reference, or any other tray handling system, tray management system, conveyor, cart or the like, without affecting the scope of the present invention. Such a tray handling system is operable to provide empty trays to article sortation stations of the article sortation assembly or machine and to convey full or partially full trays to a labeling station or the like after the trays are discharged or removed from the respective article sortation stations of the sortation machine.

Article sortation machine 25 may be any known sortation machine, such as a flat mail sorting machine, such as the type marketed by Alcatel Postal Automation System and/or Mannesmann Dematic Postal Automation and/or Mannesmann Dematic Rapistan Corp. under Model AFSM100. Alternately, however, the sortation machine may be any other type of sortation machine, such as a dual carousel system, such as the sortation machine marketed by Mannesmann Dematic Postal Automation under Model TOP2000, the sortation machine marketed by Lockheed Martin Postal Automation under Model FSM 1000, or any other sortation machine or system or flat mail sortation machine or system, without affecting the scope of the present invention.

In the illustrated embodiment, sortation machine 25 is a flat mail sorting machine having three induct stations 27 for receiving articles to be sorted by sortation machine 25. Tray destacker 10 is positioned at an induct end of an induct conveyor 23a of the tray handling system 23, and is operable to separate, destack and induct individual empty trays onto induct conveyor 23a of tray handling system 23, which conveys the empty trays along sortation machine 25 for positioning at an appropriate sortation station (not shown) of sortation machine 25, such as disclosed in U.S. pat. application, Ser. No. 09/629,009, referenced above. Optionally, a tray destacker in accordance with the present invention may be positioned at each side of the sortation assembly 25 to provide empty trays to a tray handling system or systems 23 at both sides of the sortation assembly, depending on the particular application or sortation assembly at which the tray destacker and tray handling system are implemented.

Figure 5:
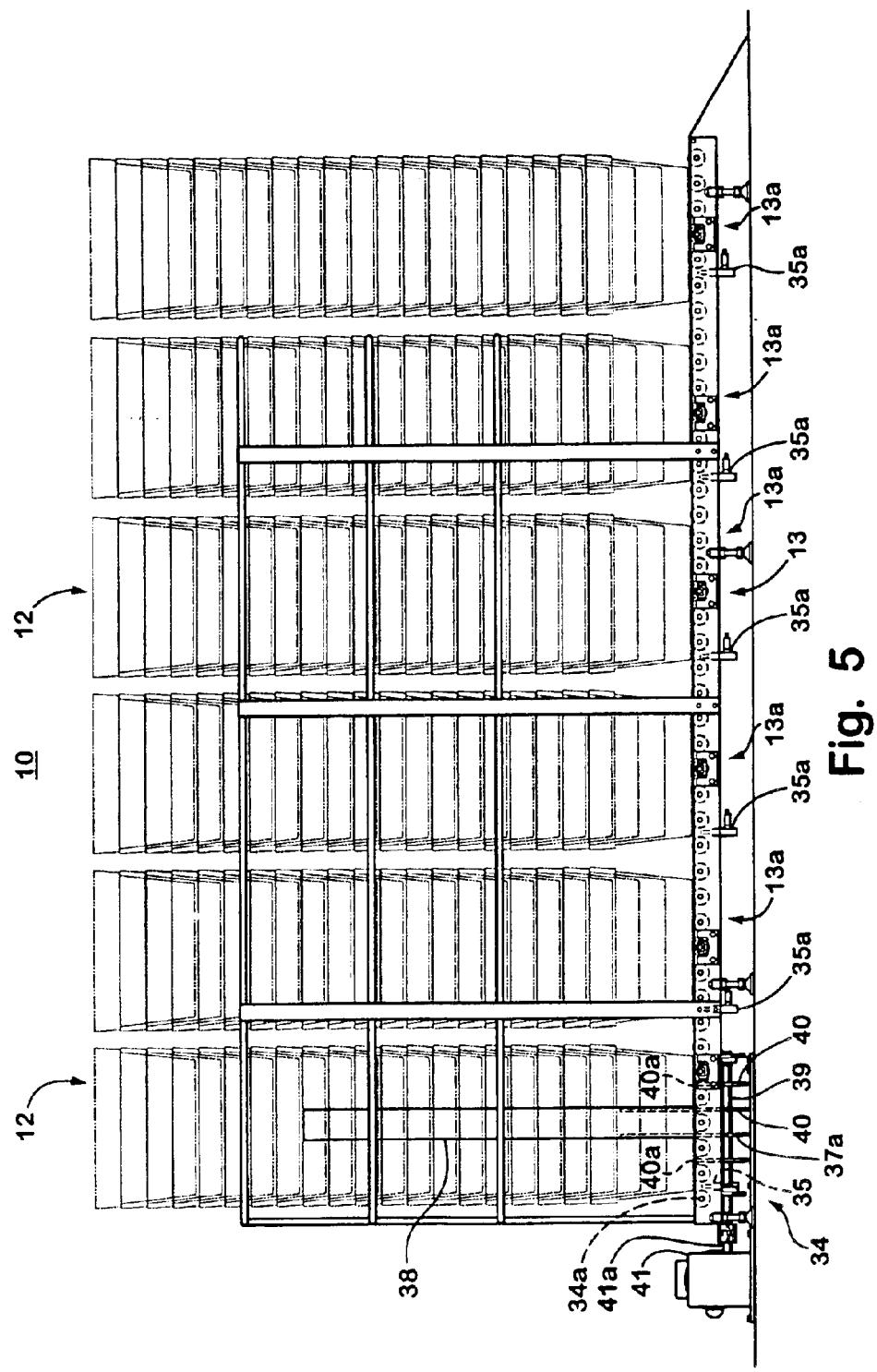
FIG. 5 is a side elevation of the tray tilting mechanism and accumulating conveyor of FIG. 4 with a plurality of stacks of trays thereon.

As shown in FIG. 5, multiple stacks of empty trays 12 may be positioned or staged at a staging or accumulating conveyor 13, and moved toward tilt station 18, which is positioned at an end of accumulating conveyor 13. In the illustrated embodiment, accumulating conveyor 13 may receive approximately six stacks of trays, with each stack containing approximately 20 trays. However, clearly the accumulating conveyor and tray destacker may receive more or less stacks of trays having more or less than 20 trays in each stack, without affecting the scope of the present invention. Optionally, a sensor 35a may be positioned at each of multiple powered roller zones 13a along accumulating conveyor 13 to detect the absence or presence of stacks of trays 12 at each zone, whereby accumulating conveyor 13 or each zone 13a of accumulating conveyor 13 may be operable to move or adjust the position of the stacks of trays in response to sensors 35a.

As shown in FIGS. 2–5, tilt station 18 includes a roller support platform 34 and a tilt mechanism 36, which is operable to tilt or lower the stack of trays 12 positioned on support platform 34 onto inclined conveyor 22. An optical sensor or photo-eye or the like 35 is preferably provided at support platform 34 for sensing the presence of a stack of trays 12 at support platform 34. In the illustrated embodiment, tilt mechanism 36 includes a plurality of tilt arms 37 mounted to a pivot rod or axle 39, which is rotatable or pivotable about its generally horizontal axis to pivot tilt arms 37 between an initial position, as shown in FIG. 2, and a tilted position, whereby tilt arms 37 generally align the stack of trays 12 with the inclined conveyor 22.

Figure 3:
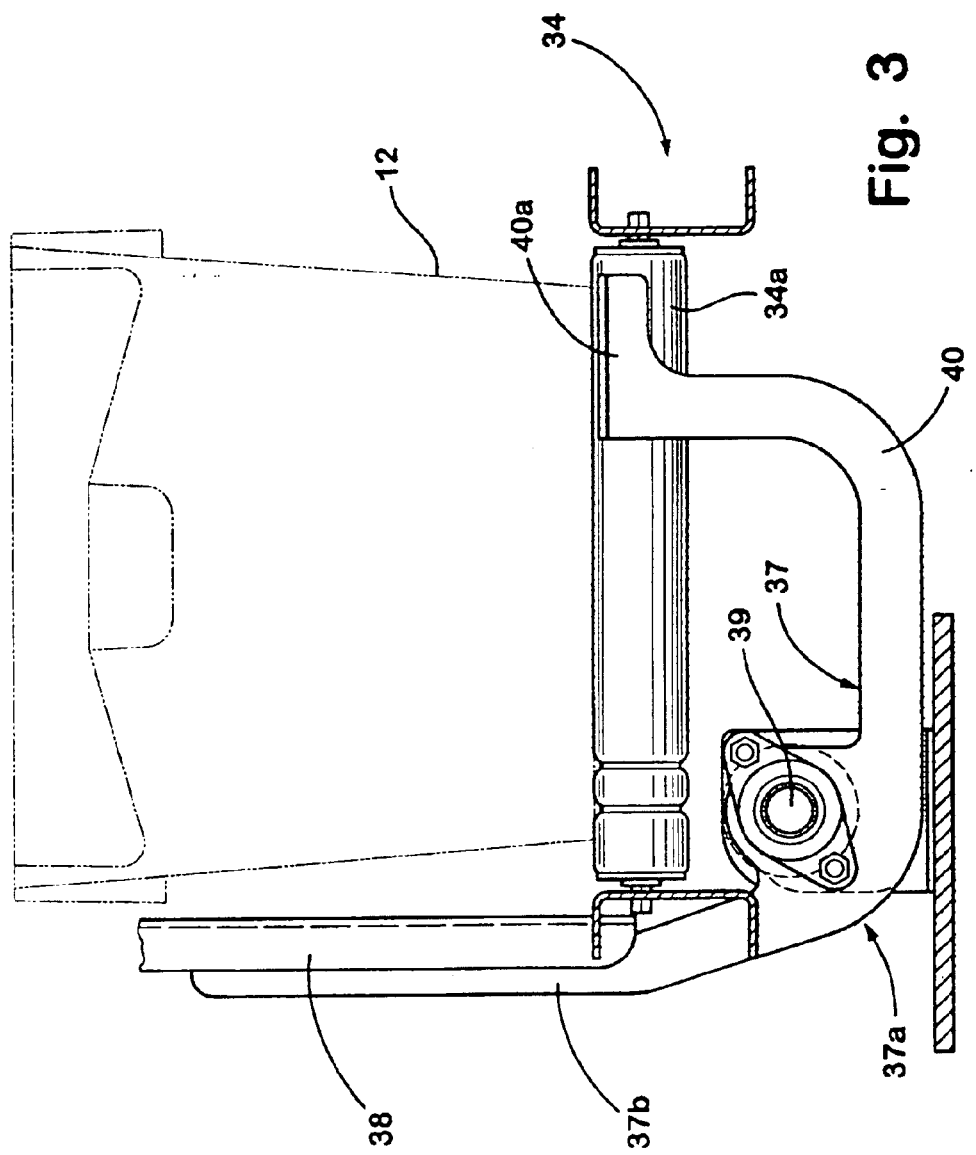
FIG. 3 is an enlarged side elevation of the area designated as III in FIG. 2, showing a tray tilting mechanism useful with the tray destacker of the present invention.

In the illustrated embodiment, two of the lifting arms 37, such as the two lifting arms 37a (FIGS. 4 and 5) generally centered at support platform 34, include corresponding brace mounting portions 37b, which extend generally vertically and are laterally offset from axle 39 when tilt arms 37 are in the initial position (FIG. 3). A vertical brace or support 38 extends generally vertically from an upper portion of brace mounting portions 37b to guide and support the stack of trays 12 as the trays are tilted toward inclined conveyor 22, as discussed below.

Figure 4:
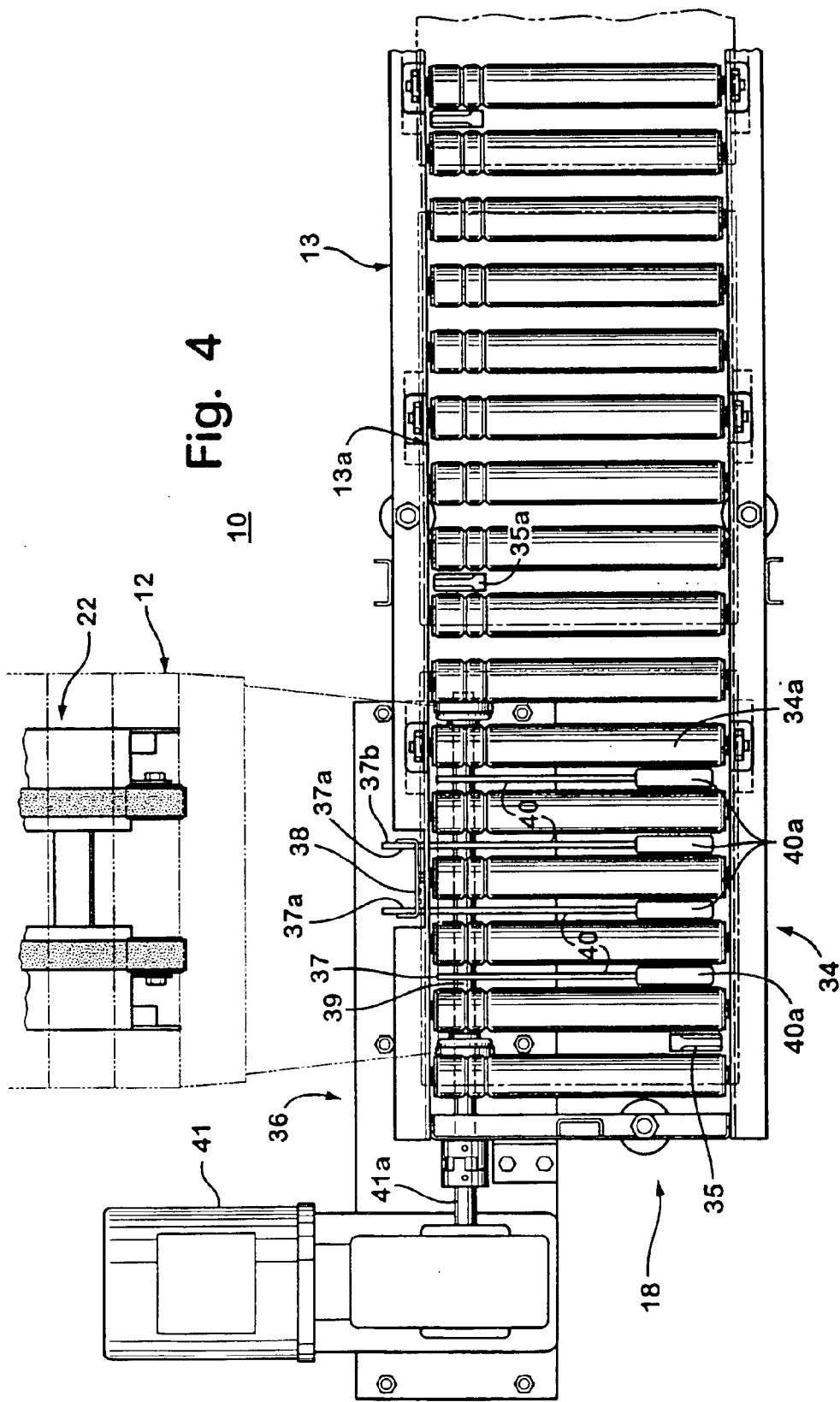
FIG. 4 is a top plan view of the tray tilting mechanism of FIG. 3 and showing an accumulating conveyor which is operable to convey stacks of trays to the tray tilting mechanism.

Each tilt arm 37 further includes a lifting arm or member 40, which is offset downwardly from and extends generally horizontally from pivot axle 39 when tilt arms 37 are in the initial position (FIG. 3). Each of the lifting arms 40 of tilt arms 37 includes a support or lifting portion 40a which is aligned with a slot between adjacent rollers 34a of support platform 34, as best seen in FIG. 4. When axle 39 and tilt arms 37 are pivoted from the initial position, support portions 40a move upward through their respective slots between rollers 34a and lift one side or end of the stack of trays 12 upward to cause tilting of the stack of trays 12 toward the vertical support 38 and inclined conveyor 22. Axle 39 continues to pivot or rotate until support 38 is generally parallel along inclined conveyor 22 and preferably between a pair of conveying belts 22c of inclined conveyor 22, as discussed below. Axle 39 is rotatable via any rotational drive means, such as a motor 41 and drive shaft 41a or the like, which is operable to rotate axle 39 in either direction between the initial and tilted positions.

Inclined conveyor or support 22 may be any type of conveyor or support which supports the stack of trays 12 on its side and which may move or convey the stack of trays 12 upward toward tray separator 24 as trays are separated and removed from the top or upper end of the stack. Inclined conveyor 22 is inclined at a desired angle and positioned with a lower or input end 22a at or near roller support platform 34 of tilt station 18 and an upper or discharge end 22b at a lower end 24a of tray separator 24. As shown in FIGS. 2 and 13A–C, inclined conveyor 22 may be supported near its discharge end 22b by a framework 50, which also supports tray separator 24, as discussed below.

In the illustrated embodiment, inclined conveyor 22 is a double belt conveyor having a pair of continuous conveyor belts 22c which are operable to move the stack of trays positioned thereon upward toward tray separator 24. The double belt conveyor allows for the support 38 of tilt mechanism 36 to pivot or move downward between the pair of belts 22c to allow the stack of trays 12 to rest directly on inclined conveyor 22, whereby the stack of trays 12 may be conveyed along inclined conveyor 22 via driving of the belts 22c. The friction between the belts 22c of inclined conveyor 22 and the sides or ends of the trays ensures that the stack of trays 12 will not slip back down the incline toward tilt station 18. One or more upper guide wheels 49a may be provided at framework 50 to engage the upper, opposite side or surface of the stack of trays 12 to further limit or preclude such slippage of the trays down the inclined conveyor 22, as discussed below.

Although shown and described as a dual belt inclined conveyor, the tray supporting device of the present invention may comprise any means for supporting the stack of trays at the tray separator 24, without affecting the scope of the present invention. For example, the tray supporting device may be a segmented belt conveyor of the type disclosed in commonly assigned, U.S. provisional application, Ser. No. 60/356.045, filed Feb. 11, 2002 by Cotter et al. for SEGMENTED BELT CONVEYOR (Attorney Docket No. SIE04 P-100), which is hereby incorporated herein by reference. It is further envisioned that the segmented belt conveyor may include corresponding separated pairs of belt portions to provide a gap or channel along the middle region of the conveyor to allow for the support 38 of tilt mechanism 36 to pivot between the belts. The segmented roller conveyor may then function to move and accumulate stacks of trays along the belt segments toward the tray separator 24.

Tray separator 24 is mounted to frame 50 and positioned between upper end 22b of inclined conveyor 22 and induct conveyor 23a of tray handling system 23. Frame 50 is a generally rectangular frame with an angled or inclined frame member 46 extending along both sides and an upper inclined support or actuating member 55 extending along an upper portion of frame 50. Roller platform 16 is positioned at one end of frame 50 and may be generally aligned with the induct conveyor 23a of the tray handling system 23. A pair of guide rollers 49a may be rotatably mounted at an end of frame 50 generally opposite to roller platform 16. Guide rollers 49a are mounted to corresponding mounting members 49 of frame 50 and are operable to engage an upper side or surface 12a of the inclined stack of trays 12 to ensure that the trays are in the proper orientation on inclined conveyor 22 as tray separator 24 engages and removes the uppermost tray 14 from the stack of trays 12, as discussed below. The guide rollers 49a further assist in limiting or substantially precluding slippage of the trays down the inclined conveyor 22. Tray separator 24 preferably includes a tray stack retaining device or mechanism 42, which retains the stack of trays in place on conveyor 22, and a tray separating device 51, which separates and removes an end or individual tray from the retained stack of trays.

As shown in FIGS. 9–13C, tray stack retaining mechanism 42 is positioned at inclined frame member 46 at or near the upper end 22b of inclined conveyor 22. Tray stack retaining mechanism 42 is operable to engage an upper edge of a second uppermost tray of the stack of trays 12 on inclined conveyor 22 to retain the remaining trays of the stack of trays in position along inclined conveyor 22 as the uppermost individual tray 14 is pulled and separated from the stack by tray separating device 51, as discussed below. Retaining mechanism 42 preferably includes a pair of retaining arms 44, which are pivotally mounted to the frame members 46 (FIGS. 2 and 10–13) extending along opposite sides of frame 50. Each retaining arm 44 is mounted to a respective frame member 46 via a bracket 46a and includes a retaining portion or lip 44a and a disengaging or releasing portion 44b extending in generally opposite directions from a pivot axle or pin 44c at bracket 46a, as shown in FIGS. 9 and 10. Each retaining arm 44 is biased in an engaging position via a biasing member 48, such as a coil spring or the like, which is connected between the respective releasing portion 44b and bracket 46a. Biasing members 48 function to bias retaining arms 44 such that retaining portions 44a are pivoted toward a retaining position and into engagement with a respective upper edge 14b of the upper tray 14 of the stack of trays 12 positioned on inclined conveyor 22. The retaining arms 44 are pivoted to a released position to release the upper tray 14 in response to a portion of tray separating device 51 contacting releasing portion 44b as tray separating device 51 engages the uppermost tray 14 of the stack of trays 12, as discussed below.

Tray separating device 51 preferably includes a pair of engaging or separating members 52 pivotally mounted to respective brackets 54d (FIGS. 11A–C and 12A–C) the lower ends 54a of opposite side members 54b, which extend generally downward from an upper support member 54c of a movable support 54. Movable support 54 is movable along inclined support member or actuator member 55 of frame 50 to move separating members 52 into engagement with the uppermost individual tray 14 and to move separating members 52 and the uppermost tray 14 away from the retained stack of trays 12 and toward and onto the feed conveyor or platform 16. Movable support 54 is movable along inclined support 55 via a drive means 56, such as a linear actuator or the like (FIGS. 6–8 and 13A–C). The drive means 56 may be any means for moving movable support 54 in either direction along frame member 55 to engage and remove the uppermost tray 14 from the stack of trays 12 on inclined conveyor 22, as discussed below, without affecting the scope of the present invention. FIGS. 6–8 depict the tray separator 24 without the stack retaining mechanism for purposes of clarity.

As best shown in FIGS. 7–9 and 11A–C, each separating member 52 includes a tray engaging portion 52a, a tapered or camming leading edge 52b and a disengaging arm or lever portion 52c. Each separating member 52 is pivotally mounted about a pivot axle or pin 53 at a respective side member 54b and is pivotable between an engaging position A (FIGS. 8 and 11C), where engaging portion 52a engages the handle portion 14a of the uppermost individual tray 14 of the stack of trays 12, and a disengaged position B (FIGS. 8 and 11B), where engaging portion 52a is disengaged or moved from the handle portion 14a of the tray 14. Each separating member 52 is biased toward the engaging position A by a biasing member 58, such as a coil spring or the like, mounted between a pin 52e extending from the respective disengaging arm or lever 52c and bracket 54d of side member 54b. The biasing member 58 functions to pivot separating member 52 toward its engaging position when the engaging portion 52a is moved to an aligned position where it is generally aligned with the handle or engaging portion 14a of the individual tray to be separated and removed from the stack of the trays. The separating member 52 pivots toward the engaging position in response to the leading edge 52a clearing the upper side surface of the tray so the separating member 52 may pivot at least partially into the handle portion 14a of tray 14, as can be seen from FIGS. 11B and 11C.

Each separating member 52 further includes a bumper or contacting member 52d (FIGS. 9 and 10) extending therefrom for contacting the releasing portion 44b of the corresponding retaining arm 44 to pivot the retaining arm 44 to disengage or release the upper tray 14 of the stack of trays 12 as separating members 52 move into position to engage the uppermost tray 14, as discussed below. Retaining arms 44 thus move to their released position in response to separating members 52 moving along the upper tray toward their aligned position. The stack of trays may then be moved by conveyor 22 to position the uppermost or end tray at an appropriate location for engagement by separating members 52. In the illustrated embodiment, contacting members 52d are generally circular bumpers or wheels mounted at pivot pins 53 of separating members 52 and extending generally downward therefrom, as shown in FIGS. 9 and 10.

Also, tray separating device 51 includes an upper, fixed contact member 60 positioned toward the upper end of each side frame member 46, such as at or near the discharge end of tray separator 24 and generally above platform 16 (FIGS. 6, 8 and 13A–C). Each contact member 60 is positioned to contact a disengaging lever 52c of a respective one of separating members 52, as the separating members 52 move upward toward the discharge end of tray separator 24, thereby causing pivotal movement of separating members 52 to the disengaged position to release the tray 14 at the feed conveyor 16 or the like.

Additionally, tray destacker 24 may include one or more optical sensors or photo eyes or the like 64a, 64b positioned at or near the lower end of frame member 46 to detect the quantity and status of the tray or trays being separated and moved from the stack of trays 12, as discussed below. Another sensor 64c may also be provided at feed conveyor 16 for determining whether a single, empty tray is properly positioned at feed conveyor 16 before the tray is conveyed onto the tray handling system conveyors. If two or more trays are separated and moved by tray separator 24 or the tray or trays is not positioned in an upright orientation at feed conveyor 16, feed conveyor 16 may be operable to delay conveying the tray or trays onto the tray handling system until the error is corrected.

Accordingly, once the accumulating conveyor 13 is loaded as shown in FIG. 5 and the tray handling system 23 is online and operational, tray destacker 10 may be activated to begin providing singulated trays to the tray handling system or the like. During operation, stacks of trays 12 are moved along accumulating conveyor 13 until a stack of trays is positioned at tilt station 18. Once the presence of the stack of trays is detected by sensor 35, and if inclined conveyor 22 is empty or at least sufficiently empty (such that there is enough space along inclined conveyor 22 to receive a stack of trays from tilt station 18) and thus ready to receive a stack of trays, tilt mechanism 36 pivots to tilt and lower the stack of trays onto inclined conveyor 22. Conveyor belts 22c of inclined conveyor 22 then convey the stack of trays upward toward upper end 22b of inclined conveyor 22 until an uppermost tray 14 is positioned adjacent to and engaged by retaining portions 44a of retaining arms 44, thereby preventing further upward movement of the stack of trays. Sensor 64b (FIGS. 6 and 7) or the like is positioned toward upper end 22b of inclined conveyor 22 to detect the presence of the uppermost tray 14 of the stack of trays 12 to signal when to stop inclined conveyor 22. When approaching the upper end 22b of inclined conveyor 22, the upper trays of the stack of trays 12 contact and are guided by guide rollers 49a, which ensure that the trays are properly positioned on their sides on inclined conveyor 22, and thus are in their proper position for tray separator 24 to separate and destack the uppermost tray from the stack.

Once the stack of trays 12 is in the destacking position along inclined conveyor 22, tray separator 24 is actuated to move movable support 54 and separating members 52 down toward the stack of trays 12 on inclined conveyor 22. As separating members 52 approach the uppermost tray 14, the tapered leading edges 52b of separating members 52 contact the upper edge 14b of uppermost tray 14, causing separating members 52 to pivot about their respective pivot pins 53 to the disengaged position B (as can be seen in FIGS. 11A, 11B, and 12A and 12B). As separating members 52 are moved further downward, bumpers or contacting members 52d contacts releasing portions 44b of retaining arms 44 to cause pivotal movement of retaining arms 44 about their respective pivot pins 44c, thereby releasing or disengaging retaining portions 44a of retaining arms 44 from the upper edge 14b of the uppermost tray 14. Separating members 52 are then moved further downward until engaging portions 52a arrive at and are generally aligned with handle portions 14a of tray 14, whereby biasing members 58 cause pivotal movement of separating members 52 to engage engaging portions 52a within the recesses defined by handle portions 14a (FIGS. 11C and 12C).

Optionally, a tray stopping device 68 (FIGS. 13A–C) may be positioned at frame 50 to stop downward movement of the stack of trays 12 as the tray separating member 52 engages the upper surface 14b of the top, individual tray 14 and moves downward along tray 14 to its aligned and engaged position with handle portion 14a. For example, tray stopping device 68 may be pivotally mounted to frame 50 and include a plurality of protruding teeth or projections 68a for engaging an edge 12b of one of the trays in the stack 12 and preventing further downward movement of stack 12 along inclined conveyor 22.

After separating members 52 are engaged with the handle portions 14a of the uppermost tray 14, tray separator 24 is operable to retract movable support 54 and separating members 52 back upward along inclined support 55 and toward feed conveyor 16 (FIG. 13B). As separating members 52 are moved away from the stack of trays 12 on inclined conveyor 22, the separating members 52 pull upward on and move the uppermost tray 14 as well. Furthermore, as separating members 52 and uppermost tray 14 are moved upward along inclined conveyor 22, contacting members 52d disengage from releasing portions 44b of retaining arms 44, such that biasing members 48 cause pivotal movement of retaining arms 44 back toward the retaining position, whereby retaining portions 44a engage the upper portion of the next adjacent tray in the stack of trays as the stack of remaining trays is pulled upward with uppermost tray 14 or conveyed upward by inclined conveyor 22. Guide rollers 49a also contact the next upper or adjacent tray of the stack of trays 12 as the uppermost tray 14 is removed by separating members 52 and may provide further resistance to movement of the stack of trays 12 as the uppermost tray 14 is pulled and separated from the stack. After the stack of trays 12 is sufficiently depleted or conveyed upward along inclined conveyor 22, tilt mechanism 36 is pivoted back to its initial position to receive a new stack of trays at platform 34 of tilt station 18.

Also, as the uppermost tray 14 is separated and moved from the stack of trays 12, sensors 64a, 64b are operable to detect the tray 14 and determine if only a single tray has been separated from the stack or if two or more trays have been erroneously pulled from the stack of trays. If more than one tray is detected at separating members 52, then a fault signal or code may be generated to stop the tray destacker 10 until the situation is corrected.

After a single or individual tray 14 has been separated from the stack of trays 12, tray separator 24 pulls the individual tray upward by separating members 52 toward feed conveyor 16. After the tray 14 has cleared the upper end 22b of inclined conveyor 22, tray 14 may pivot about engaging portions 52a of separating members 52 to a generally upright orientation via gravitational forces acting on tray 14. Optionally, an angled support 66 (FIGS. 6 and 13A–C) may be positioned at feed conveyor 16 to support and guide tray 14 into its upright orientation, as shown in FIGS. 13B and 13C.

As best seen in FIGS. 2 and 13A–C, tray separator 24 is preferably operable to pull and move the separated tray 14 along an incline or angle which is greater than the angle of inclined conveyor 22, which allows the tray to pivot toward its upright orientation as the tray 14 is moved upward relative to the plane of inclined conveyor 22 by tray separator 24. An upper guide member 62 is positioned at the upper end of frame 50 for guiding a tray 14 supported by separating members 52 into a proper, upright position, prior to separating members 52 releasing the tray onto the feed conveyor 16. Accordingly, while continuing up the incline, the tray 14 is lifted and set in its upright position, and may be further guided by upper guide member 62 to position the tray properly at or just above platform or feed conveyor 16.

When separating members 52 have moved the tray 14 toward or near a position generally at platform or feed conveyor 16, fixed contact members 60 engage releasing levers 52d of separating members 52, thereby causing pivotal movement of separating members 52 about pins 53 (as shown at B in FIG. 8) to disengage engaging portions 52a from tray handles 14a, thereby releasing tray 14 at feed conveyor 16. Sensor 64c then detects the tray at feed conveyor 16 and appropriate controls determine if the tray is properly positioned on conveyor 16. If the tray 14 is in a proper, upright position on feed conveyor 16, feed conveyor 16 is then operable to convey the tray onto induct conveyor 23a of tray handling system 23. Tray separator 24 is then actuated to move separating members 52 back down to engage and separate the next tray from the stack of trays 12 on inclined conveyor 22 in a similar manner as discussed above. The process is repeated until a sufficient number of trays are provided to the tray handling system by tray destacker 10.

Therefore, the automated tray destacker of the present invention is operable to provide a generally constant and continuous supply of empty trays, in their correct orientation, to an induct conveyor of an automated tray handling system or any other type of system or apparatus. The tray destacker thus ensures that an empty tray is available when a full tray has been extracted by the tray handling system. When a signal that one or more trays are required, such as a signal that a tray has been filled by and removed from sortation machine, is received by the tray destacker, an empty tray will be discharged to replace the filled tray at the open or vacant sortation station. During a sweep operation, where all of the trays at the sortation machine are replaced with empty trays, the illustrated embodiment of the tray destacker of the present invention may be operable to separate and discharge empty trays at a rate of approximately 20 empty trays per minute.

Figure 14:
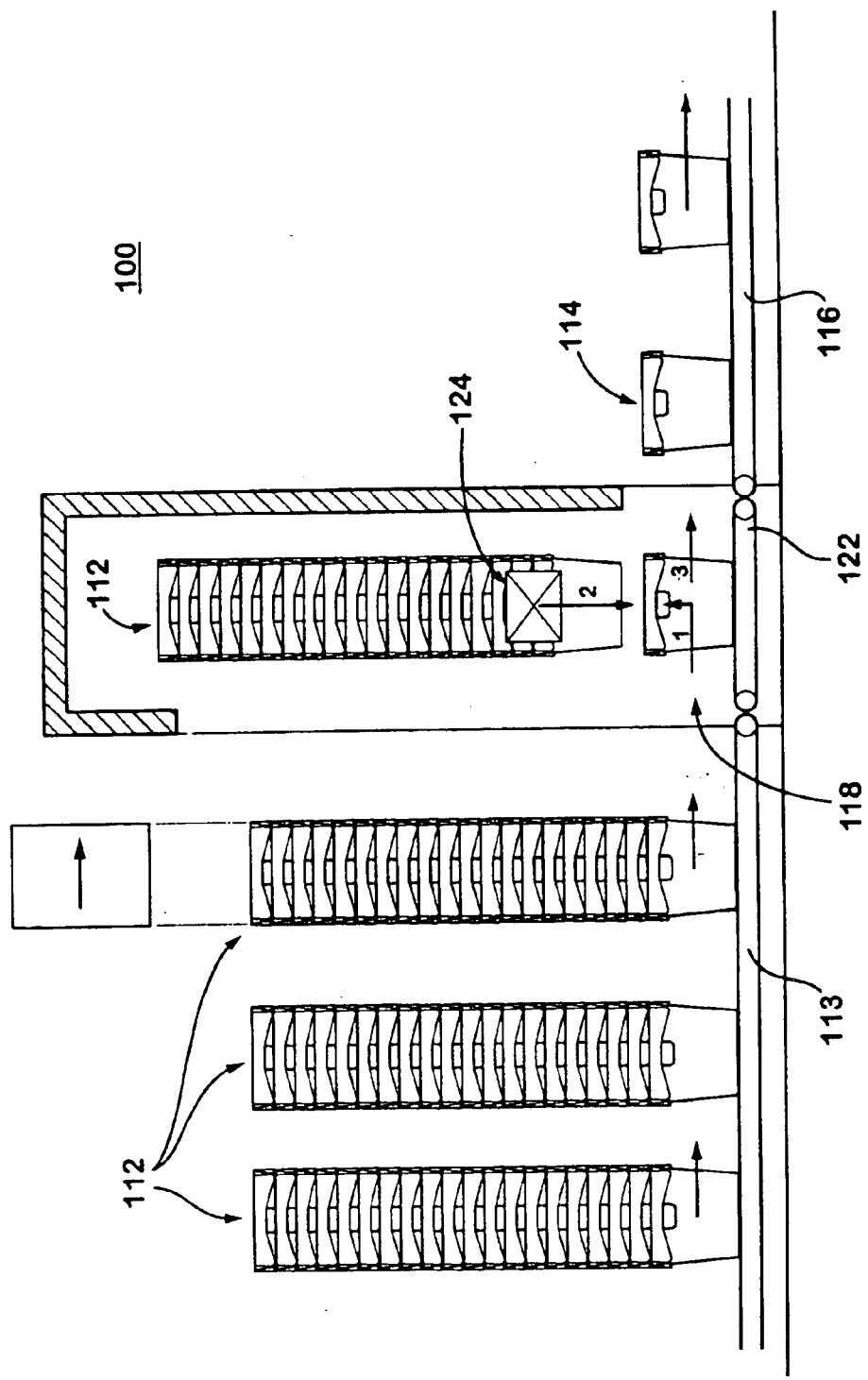
FIG. 14 is a side elevation of an alternate embodiment of a tray destacker in accordance with the present invention, where generally vertical stacks of trays are conveyed sideways and discharged at a lower portion of the destacker.

Referring now to FIGS. 14–18H, a tray destacking mechanism or apparatus 100 receives a stack of trays 112, preferably of empty trays, from an input conveyor 113 and is operable to separate individual trays from the stack 112 and discharge the individual empty trays 114 onto a take-away conveyor 116 (FIG. 14). The tray destacking mechanism or tray destacker 100 is thus operable to automatically separate trays from a stack of trays and discharge individual stacked trays for use with various tray handling or tray management systems. For example, the tray destacker 100 may be implemented at an induct end of a tray handling system (not shown) for an article sortation system (also not shown). Similar to tray destacker 10, discussed above, tray destacker 100 may be implemented at any type of tray handling system, such as a conveying or transporting system for moving trays to a sortation machine, such as a tray handling system of one of the types disclosed in commonly assigned U.S. patent applications, Ser. No. 09/629,009, filed Jul. 31, 2000 by Olson et al. for AUTOMATIC TRAY HANDLING SYSTEM FOR SORTER, now U.S. Pat. No. 6,561,339 (Attorney Docket RAP04 P-601); or Ser. No. 09/831,068, filed May 4, 2001 by Kalm et al. for AUTOMATIC TRAY HANDLING SYSTEM FOR SORTER, now U.S. Pat. No. 6,561,360 (Attorney Docket RAP04 P-580A), which are hereby incorporated herein by reference, or any other tray handling system, tray management system, conveyor, cart or the like, without affecting the scope of the present invention.

As shown in FIG. 14, the stacked trays 112 may be conveyed sideways toward and into tray destacker 100, in order to facilitate positioning a greater number of stacks of trays along the input conveyor 113 than if the trays were conveyed lengthwise. Tray destacker 100 is operable to receive the stacked trays 112 at a lower portion 118 and discharge the individual empty tray 114 from lower portion 118 of tray destacker 100 (FIG. 14). Alternately, a tray destacker 100' (FIG. 15) may be operable to lift the trays from the lower portion 118 and discharge the empty trays 114 at an upper portion 120 of tray destacker 100', whereby the trays 114 are discharged onto an upper takeaway conveyor 116' or onto a gravity conveyor 116" (FIG. 17) or the like. It is further envisioned that the tray destacker 100, 100' may be operable to deliver singulated trays lengthwise at 90 degrees to the input line of the tray handling system or the like.

Figure 16:
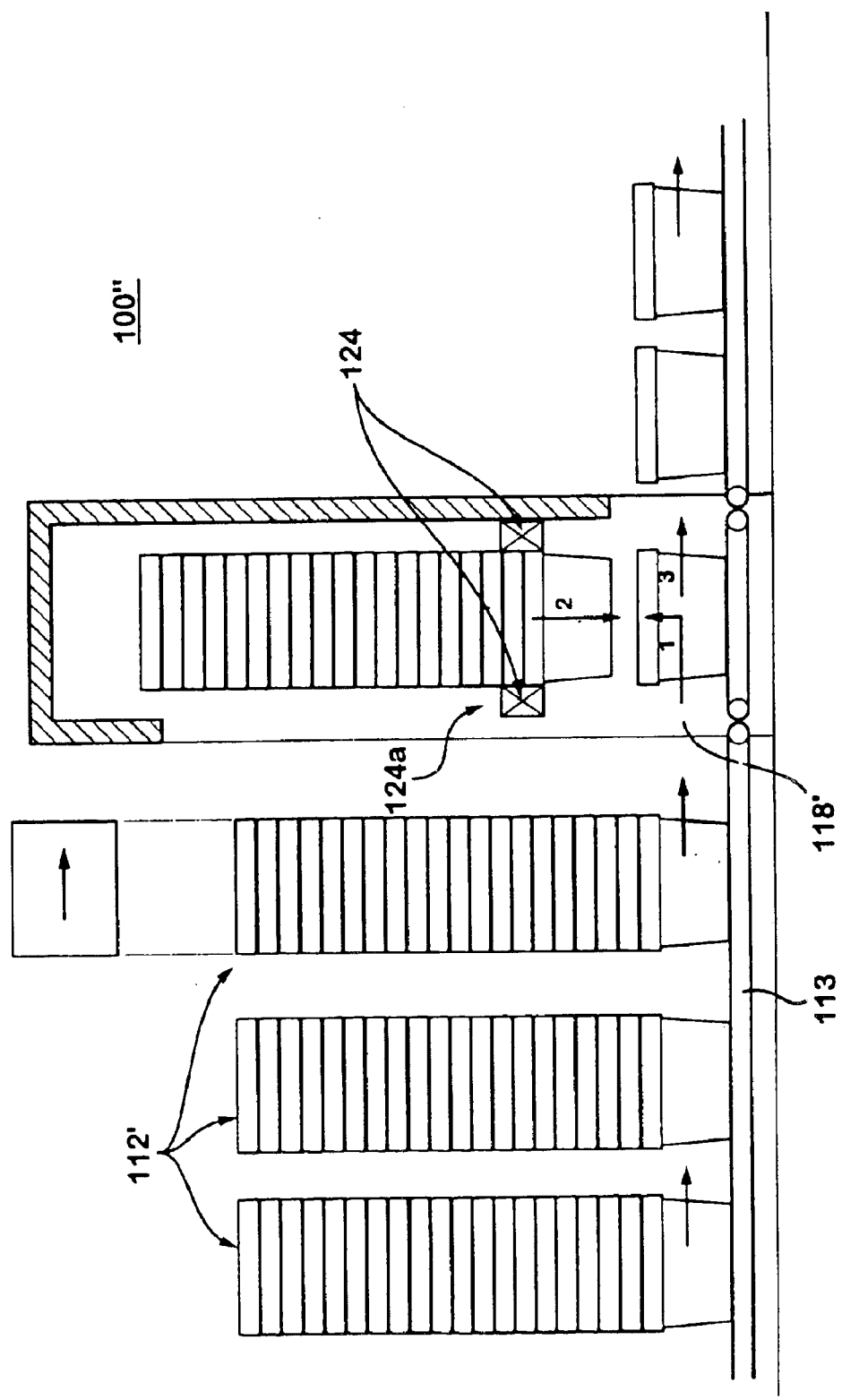
FIG. 16 is a side elevation of another tray destacker in accordance with the present invention, where generally vertical stacks of trays are conveyed lengthwise and discharged at a lower portion of the destacker.
Figure 17:
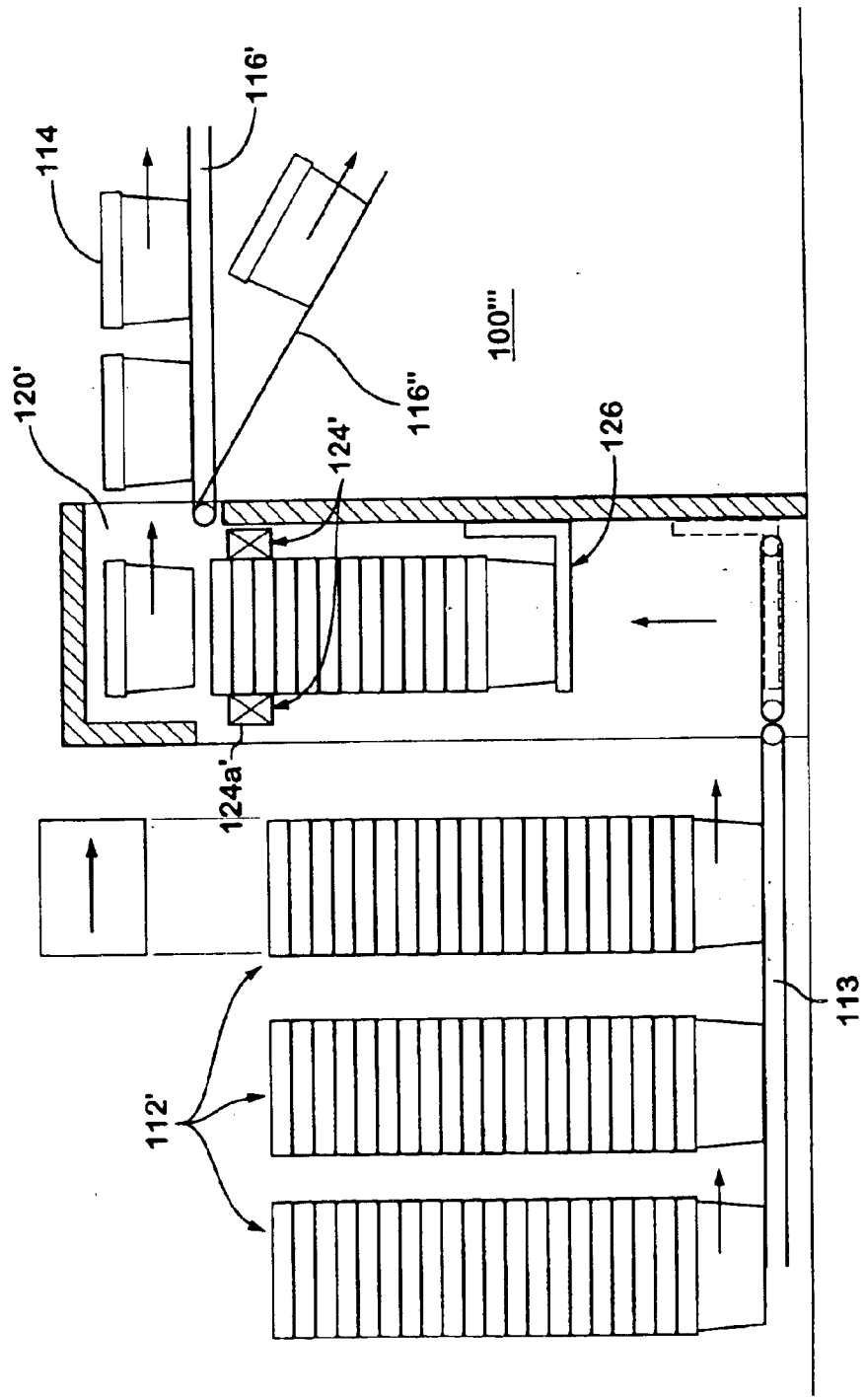
FIG. 17 is a side elevation of another tray destacker in accordance with the present invention, where generally vertical stacks of trays are conveyed lengthwise and discharged at an upper portion of the tray destacker.
Figure 18:
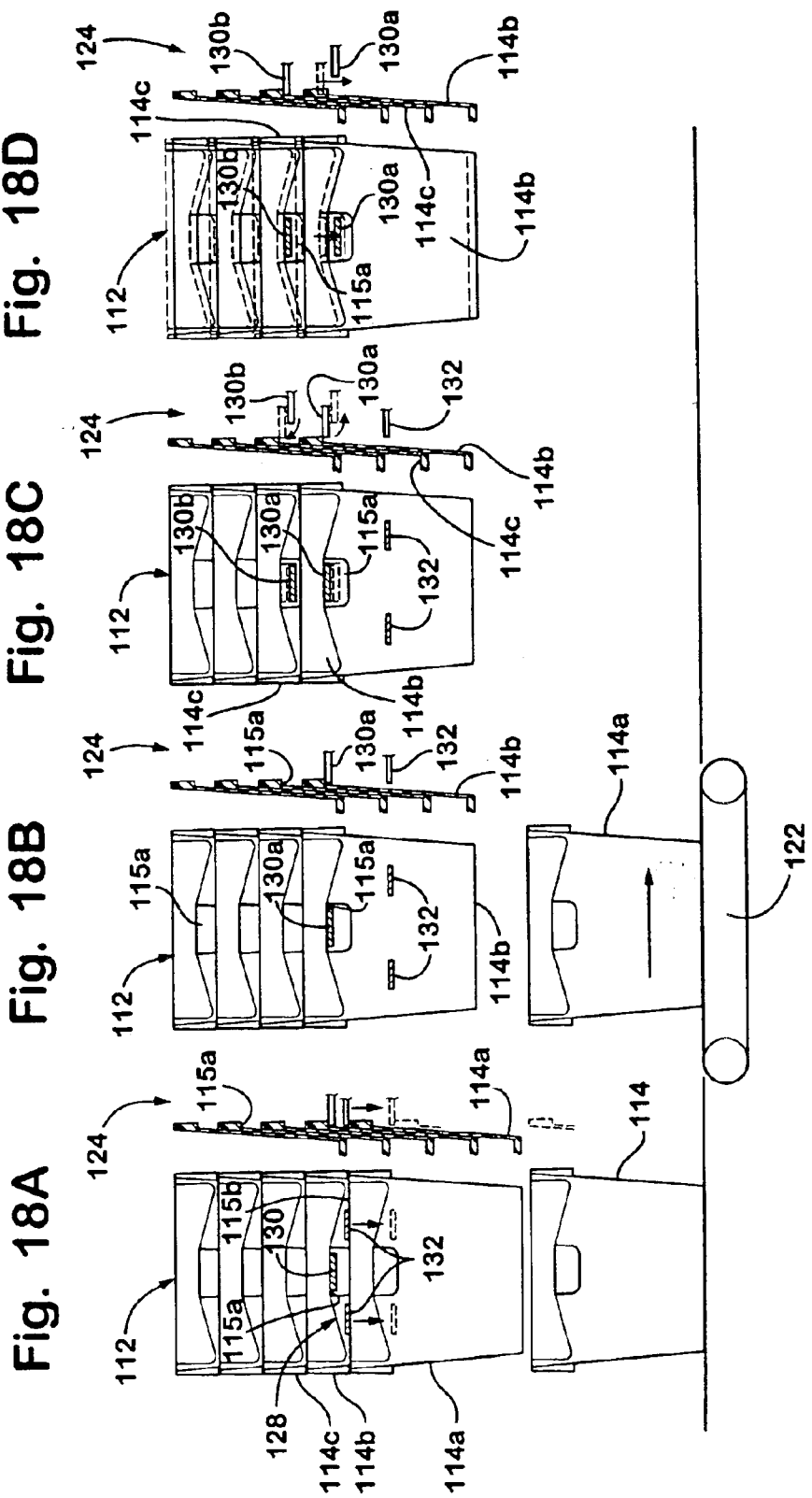
FIGS. 18A–18H are side elevation and partial sectional end views of a tray destacking device in accordance with the present invention, showing the different stages of the supporting and destacking process of the tray destackers of FIGS. 14 and 16.
Figure 19:
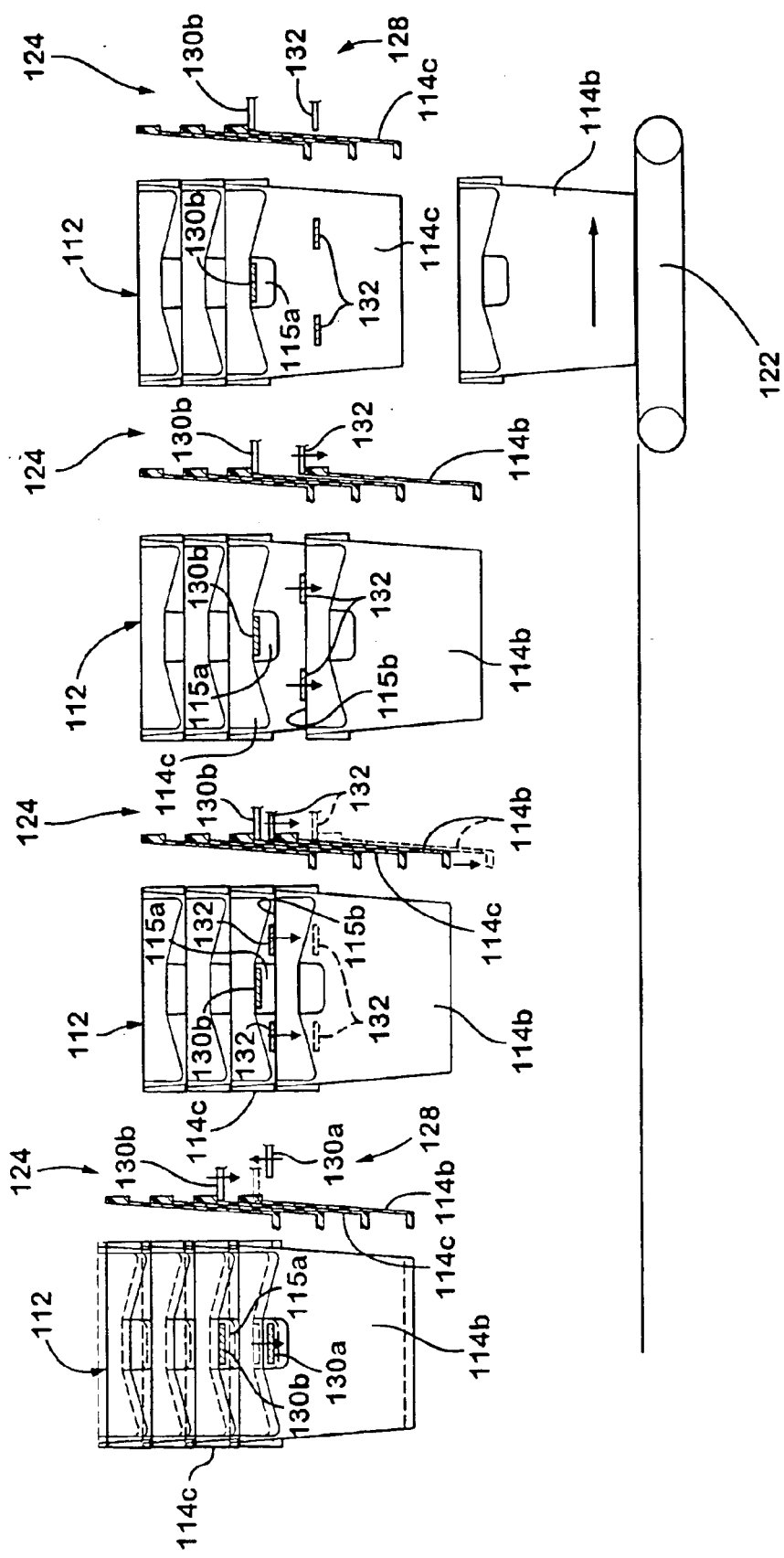
FIG. 19 is a top plan view of another embodiment of a tray destacker in accordance with the present invention, with frictional rollers supporting, lowering and separating the trays.
Figure 20:
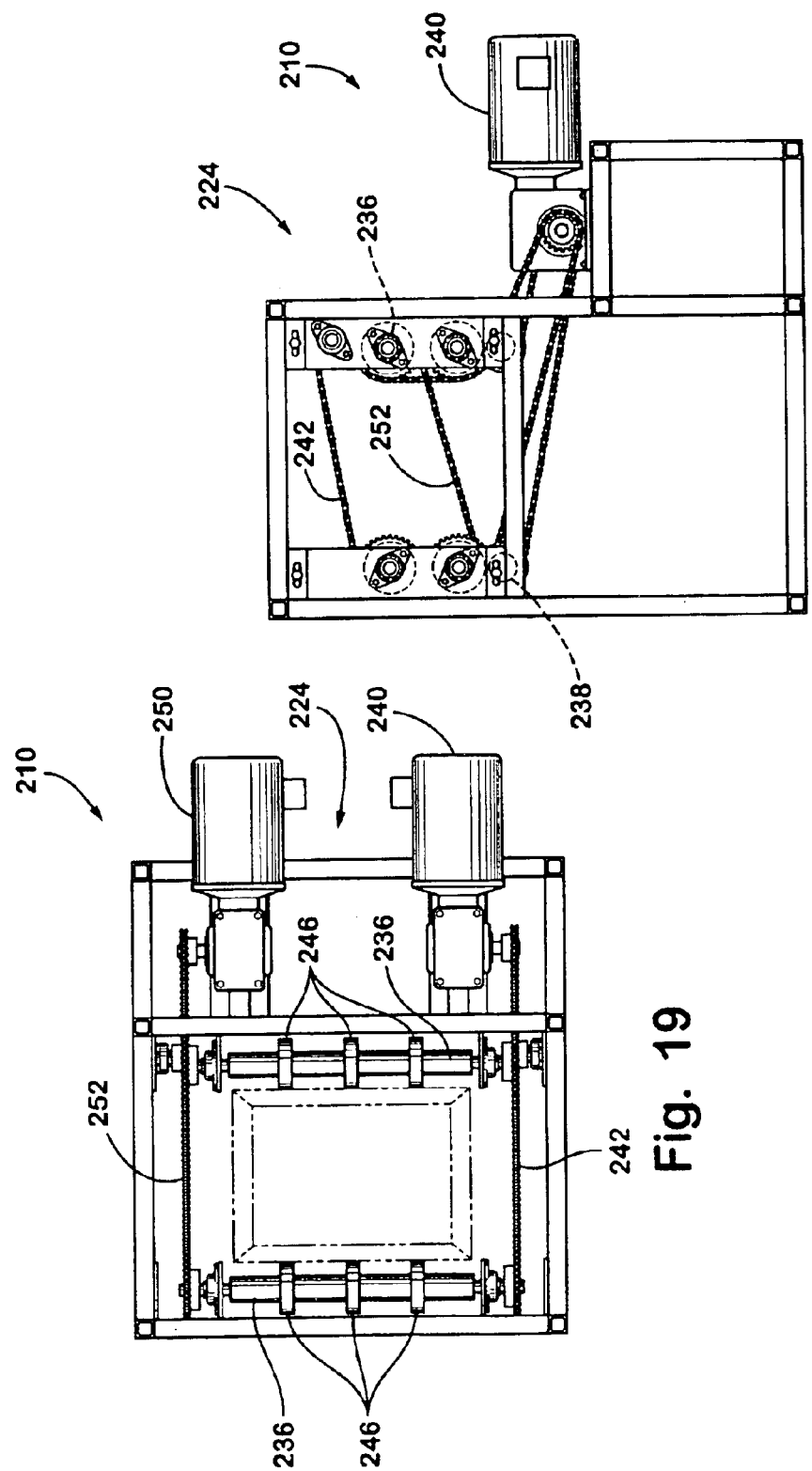
FIG. 20 is a side elevation of the tray destacker of FIG. 19.

It is also envisioned that stacked trays 112' may be conveyed lengthwise, as shown in FIGS. 16 and 17, in order to enhance stability of the trays as they are conveyed along input conveyor 113. A tray destacker 100", 100'" may then receive the stacked trays 112' at a lower portion 118' and separate and discharge the individual empty trays 114' at either the lower portion 118' (FIG. 16) or from an upper portion 120' (FIG. 17), respectively, without affecting the scope of the present invention.

Tray destacker 100 includes a conveying portion 122, which is operable to receive the stacked trays 112 from input conveyor 113 and to discharge the individual trays 114 to output or takeaway conveyor 116, and a tray separating device 124, which is operable to separate each individual tray from the stack of trays one at a time. As shown in FIGS. 14 and 13, when the tray destacker discharges the individual trays at the lower portion 118, 118', tray separating device 124 may also function to raise and support the stack of trays 112 above conveying portion 122, as discussed in detail below. Alternately, if the tray destacker discharges the individual trays at the upper portion 120, 120', as shown in FIGS. 12 and 14, a tray separating device 124' is operable to lift the individual trays upward from the top of the stack and discharge the trays onto the takeaway conveyor 116', while a tray stack supporting device 126 is included to support the trays at the bottom of the stack and lift the stack up toward the upper portion 120, 120'.

Tray separating device 124 of tray destacker 100, 100" functions to lift, support and separate the individual trays from the bottom of the stack of empty trays. Referring now to FIGS. 18A–18H, tray separating device 124 may include a caterpillar mechanism which includes multiple fingers or extensions 128, which are movable generally vertically and horizontally to engage/disengage the trays and to lift/lower the trays. More particularly, fingers 128 may include supporting fingers 130, which support the stack of trays, and separating fingers 132, which separate the individual trays 114 from the bottom of the stack of trays 112. As shown in FIGS. 18A and 18B, support fingers 130 engage a handle, lip or opening 115a of a lower one of trays 114 to support the stack of trays above conveying portion 122. The support fingers 130 may initially engage a bottom tray of the stack as the stack is received by conveying portion 122 and raise the entire stack of trays upward above conveying portion 122. The separating fingers 132 then function to engage an upper lip 115b of the lowermost or bottom tray 114a and push downward on the lip 115b to separate the bottom tray, which then falls downward onto conveying portion 122, where it is then discharged onto the takeaway conveyor 116. The support fingers 130 and separating fingers 132 may cycle to continuously discharge the bottom tray 114a and lower the stack of trays for subsequent discharge of the new bottom tray, as discussed in detail below. The destacker may be operable to discharge trays onto the takeaway conveyor continuously or as the previously discharged trays are moved along the takeaway conveyor, such that a desired gap arises between consecutively discharged trays.

Initially, as shown in FIG. 18A, a support finger or pair of support fingers 130a (one at each end of the tray) are inserted at least partially within the handle 115a of a tray 114b which is positioned immediately above the lowest or bottom tray 114a, thereby supporting the entire stack of trays 112, with the bottom tray 114a being held by frictional engagement with the next upper tray 114b. When it is time to discharge a tray from destacker 100, the separating fingers 132 engage the upper lip 115b of bottom tray 114a and push downward until bottom tray 114a releases from the next upper tray 114b and falls downward to the conveying portion 122. The separated tray 114a is then discharged from tray destacker 100 via conveying portion 122 (FIG. 18B).

After the bottom tray 114a has been discharged from the stack of trays 112, a second support finger or pair of fingers 130b (FIG. 18C) is at least partially inserted into or engaged with the handle or opening 115a of a next upper tray 114c, in order to support the stack of trays by the next upper tray 114c. Once the support fingers 130b are in position to engage and support tray 114c, the initial support fingers 130a release from handle 115a of tray 114b, such that tray 114b is held in place via frictional engagement with supported tray 114c. Support fingers 130a may drop downward and pull back from tray 114b to allow the stack of trays 112 to drop downward whereby support fingers 130b will engage the openings 115a of tray 114c to support the stack of trays 112 (FIG. 18D). The first support fingers 130a may then cycle back upward, while the second support fingers 130b move downward (FIG. 18E), in order to lower the stack of trays to the appropriate position for the separating fingers 132 to separate the bottom tray 114b. As shown in FIGS. 18F–18H, separating fingers 132 then again engage the upper lip 115b of bottom tray 114b and push downward to separate and release tray 114b from tray 114c, such that tray 114b may then be discharged by conveying portion 122 (FIG. 18H). The entire process may then be repeated until all the trays of the stack 112 are individually discharged from tray destacker 100.

In the illustrated embodiment, the supporting fingers 130 are movable in a generally continuous loop such that each finger is cycled around the loop to support, lower and release the stack of trays at the appropriate time. The supporting fingers 130 may be cycled via any means which moves the fingers or paddles vertically and laterally to engage and disengage and move the trays, such as via a chain or belt reaved about pulleys or rollers, a cam device, a servo motor and screw drive or the like, without affecting the scope of the present invention. Similarly, the separating fingers 132 may be cycled about a generally continuous loop or otherwise moved via any known means, in order to engage, move and release each tray which becomes positioned at the bottom of the stack of trays. In applications where the trays are conveyed lengthwise into the tray destacker (FIGS. 16 and 17), an input side 124a, 124a' of the tray supporting and separating device 124, 124' may be movable to move from the path of the stack of trays, in order to allow the stack of trays to be received into the tray destacker.

Figure 15:
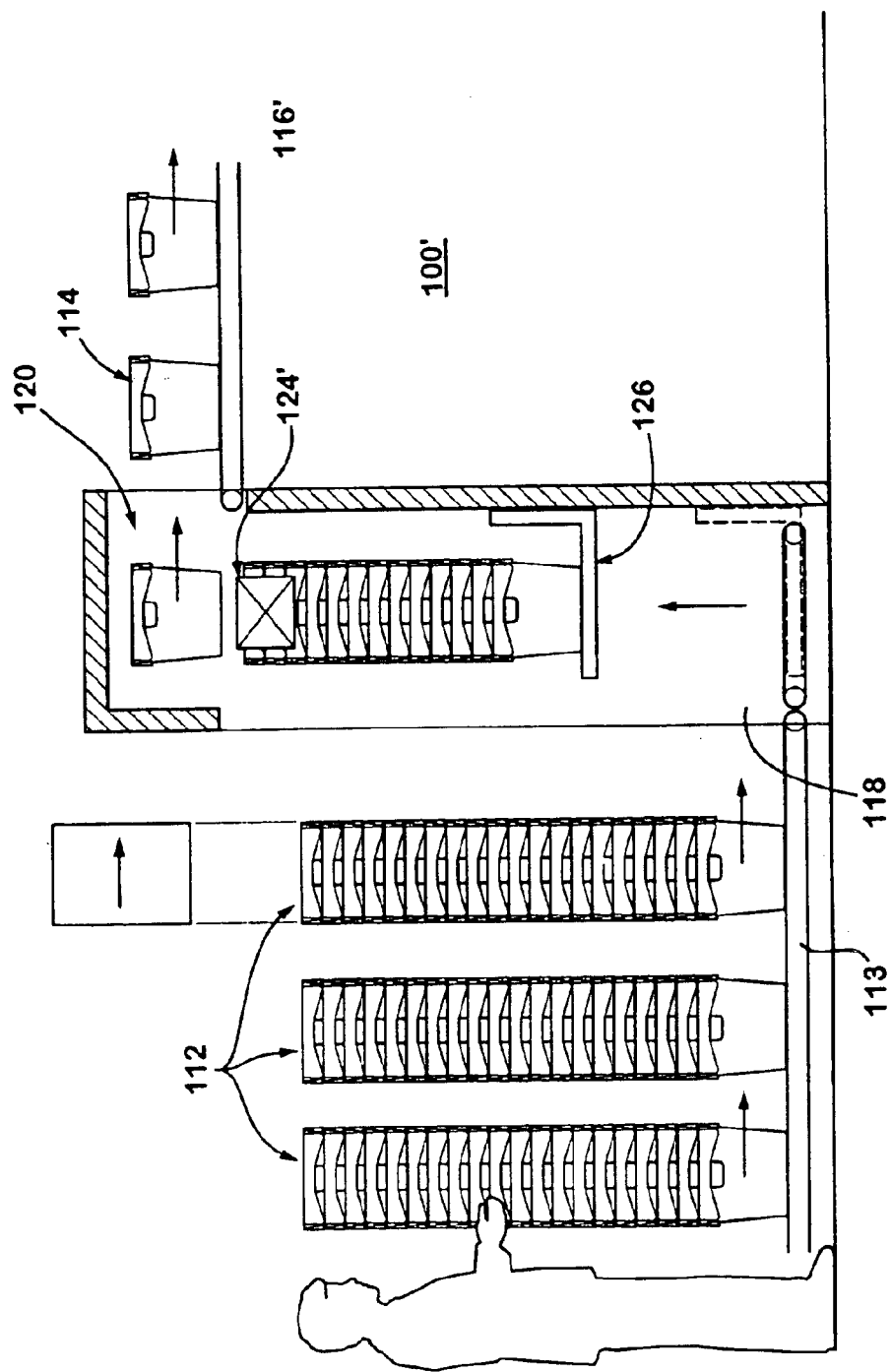
FIG. 15 is a side elevation of another tray destacker in accordance with the present invention, where generally vertical stacks of trays are conveyed sideways and discharged at an upper portion of the destacker.

Although shown and described above as discharging the individual trays at the bottom of the tray destacker, clearly, the present invention is equally applicable to applications where it is desired to discharge the individual trays at the upper region of the tray destacker, such as the tray destacker 100', 100'" shown in FIGS. 15 and 17. In such applications, the tray separating device 124' is operable to separate, lift and discharge the uppermost or top tray of the stack of trays, utilizing aspects of the separating devices discussed above. After each top tray is discharged from the tray destacker 100', 100'", the tray stack supporting device 126 is operable to raise the stack of trays upward to position the new top tray at an appropriate height for release and discharge by the tray separating device 124'. The tray stack supporting device 126 may be an elevating platform or the like, which engages a bottom surface of a lowermost tray of the stack of trays and which may be raised and lowered via any known drive means, such as a servo motor and screw drive, belts, chains or the like, without affecting the scope of the present invention.

Referring now to FIGS. 19–22B, an alternate embodiment of a tray destacker 210 may include a tray supporting and separating device 224, which may include a plurality of supporting rollers 236 and separating rollers 238. The supporting rollers 236 support the trays via frictional engagement with the sides of the trays, while the plurality of separating rollers 238 (FIGS. 20, 21 and 22B) separate the bottom tray from the stack 212. More particularly, tray supporting and separating device 224 may include two or more supporting rollers 236 (one or more at each side of the stack of trays) and one or more separating roller 238. In the illustrated embodiment, tray supporting and separating device 224 includes four supporting rollers 236 (two at each side of the trays) and two separating rollers 238 (one at each side of the trays). The supporting rollers 236 are positioned generally above the separating rollers 238 and are rotatable in either direction via a drive motor 240 to lift upward on the stack of trays via frictional engagement of the side walls of the trays or to lower the stack to an appropriate level for discharging the bottom tray, as discussed below. The rollers on each side of the trays are rotatable in the opposite direction from the rollers on the other side, such that the direction of the force applied at the side walls of the trays is the same between both sides of the trays. As shown in FIG. 22A, this may be accomplished via routing a drive chain or belt 242 around the rollers 236 and a pulley or sprocket 244. Preferably, the supporting rollers 236 include a plurality of rubber wheels 246 (FIGS. 19 and 21) positioned therealong to enhance gripping of the trays.

The separating rollers 238 are similar to supporting rollers 236, and may also include a plurality of rubber wheels 248 (FIG. 21). Separating rollers 238 are positioned generally below supporting rollers 236 and engage the side walls of the bottom tray of stack 212. Separating rollers 238 are rotatable via a drive motor 250 and belt or chain 252 in order to apply a downward force at the side walls of the lowermost tray of the stack 212. Similar to supporting rollers 236, the separating roller 238 at each side of the trays is rotatable in the opposite direction with respect to the roller at the other side, in order to have the frictional forces being applied in the same direction by the two rollers 238. As shown in FIG. 21B, this may be accomplished via routing the drive belt or chain 252 around an additional sprocket or pulley 254.

Accordingly, as a stack of trays 212 is received by the tray destacker 224, the supporting rollers 236 and the separating rollers 238 may be rotated to raise the stack upward to an appropriate level to provide sufficient clearance below the trays for the bottom tray to be discharged and conveyed out from underneath the stack. The rollers may then stop rotating, whereby the friction between the rubber wheels and the tray sidewalls will substantially preclude downward movement of the stack of trays. When a tray is to be separated and discharged from the tray destacker, the separating rollers 238 are rotated in the opposite direction to apply a frictional force downward at the sidewalls of the bottom tray. This results in downward movement of the bottom tray, which then releases from the next upward positioned tray and drops onto conveying portion (not shown in FIGS. 19–22B), where it may be discharged from the tray destacker onto the takeaway conveyor. The supporting rollers are then rotated slightly in the opposite direction to lower the stack of trays downward so the new bottom tray is aligned with the separating rollers. The process then repeats itself until all of the trays have been individually released and discharged from the tray destacker.

Therefore, the present invention provides a tray destacking apparatus which is operable to separate and unstack individual trays from a stack of empty trays received by the tray destacking apparatus. The tray destacking apparatus provides an inexpensive means for automatically and continuously destacking or singulating individual trays from a stack of trays and discharging the individual trays onto a takeaway conveyor or the like in a separated, in line manner. The tray destacking apparatus may be implemented at an input end of a tray handling system to automatically provide empty trays to the input of the tray handling system in a singulated manner. The present invention thus obviates the need for manual feeding of empty trays into a tray handling system or the like, such as for an article sortation system or the like. Also, the tray destacking apparatus of the present invention is operable to engage an edge or handle portion of the trays and thus does not apply lateral forces to the trays. Therefore, the tray destacking apparatus of the present invention is suitable for use in destacking mail trays, such as corrugated plastic mail trays and/or the like.

Changes and modifications in the specifically described embodiments can be carried out without departing from the principles of the invention, which is intended to be limited only by the scope of the appended claims as interpreted according to the principles of patent law.

The embodiments of the invention in which an exclusive property or privilege is claimed are defined as follows:

1. A tray destacking device for destacking an individual tray from a stack of at least partially nested trays, each of the trays having a first engaging portion and a second engaging portion, said tray destacking device comprising:

a tray supporting device for supporting a stack of at least two at least partially nested trays, said tray supporting device being inclined and supporting the stack of trays along an inclined support surface; and a tray separating device operable to separate and discharge individual trays from the stack of trays, said tray separating device being movable between an engaging position for engaging the first engaging portion of an individual tray of the stack of trays and a disengaging position remote from the first engaging portion of the trays supported by said tray supporting device, said separating device being biased toward said engaging position by a first biasing member and movable to said engaging position when generally aligned with the first engaging portion of said individual tray in response to said first biasing member, wherein said tray separating device is operable to engage the first engaging portion of said individual tray and exert a force at the first engaging portion generally in a separating direction along the stack of trays.

2. The tray destacking device of claim 1 including a tray retaining device for retaining the stack of trays on said tray supporting device while said tray separating device separates the individual tray from the stack of trays.

3. The tray destacking device of claim 2, wherein said tray supporting device comprises a conveyor which is operable to move the stack of trays to an aligned position along said tray supporting device with respect to at least one of said tray separating device and said tray retaining device.

4. The tray destacking device of claim 2, wherein said tray retaining device is movable between a retaining position where said tray retaining device engages the second engaging portion of a tray of the stack of trays and a released position where said tray retaining device is remote from the second engaging portion of the trays supported by said tray supporting device.

5. The tray destacking device of claim 4, wherein said tray retaining device is biased toward said retaining position by a second biasing member, said tray retaining device being movable to said retaining position in response to said second biasing member to engage the second engaging portion of a next tray adjacent to said individual tray when said tray separating device moves said individual tray in said separating direction.

6. The tray destacking device of claim 1, wherein said tray separating device comprises at least one engaging member which is pivotable between said engaging position and said disengaging position.

7. The tray destacking device of claim 6, wherein said at least one engaging member of said tray separating device is movable along said tray separating device between said discharge end of said tray supporting device and a discharge end of said tray separating device.

8. The tray destacking device of claim 7, wherein said at least one engaging member comprises a camming surface for engaging an upper edge of the stack of trays to pivot said at least one engaging member to said disengaging position as said at least one engaging member moves toward a position generally aligned with said first engaging portion of said individual tray.

9. The tray destacking device of claim 8, wherein said at least one engaging member of said tray separating device comprises an engaging surface, said first biasing member pivoting said at least one engaging member to pivot said engaging surface into engagement with said first engaging portion in response to said at least one engaging member arriving at said generally aligned position.

10. The tray destacking device of claim 7 including a tray retaining device for retaining the stack of trays on said tray supporting device while said tray separating device separates the individual tray from the stack of trays, said tray retaining device being pivotally mounted at a discharge end of said tray supporting device.

11. The tray destacking device of claim 10, wherein said tray retaining device is pivotable between a retaining position where said tray retaining device engages the second engaging portion of a tray of the stack of trays and a released position where said tray retaining device is remote from the second engaging portion of the trays supported by said tray supporting device.

12. The tray destacking device of claim 11, wherein said tray separating device comprises a releasing member which is adapted to engage and pivot said tray retaining device toward said released position as said at least one engaging member moves toward said generally aligned position.

13. The tray destacking device of claim 12, wherein said tray retaining device includes a second biasing member which biases said tray retaining device toward said retaining position.

14. The tray destacking device of claim 13, wherein said second biasing member pivots said tray retaining device to said retaining position in response to said releasing member moving in said separating direction and disengaging from said tray retaining device.

15. A tray destacking device for destacking an individual tray from a stack of at least partially nested trays, each of the trays having a first engaging portion and a second engaging portion, said tray destacking device comprising:

a tray supporting device for supporting a stack of at least two at least partially nested trays;

a tray separating device operable to separate and discharge individual trays from the stack of trays, said tray separating device being movable between an engaging position for engaging the first engaging portion of an individual tray of the stack of trays and a disengaging position remote from the first engaging portion of the trays supported by said tray supporting device, said separating device being biased toward said engaging position by a first biasing member and movable to said engaging position when generally aligned with the first engaging portion of said individual tray in response to said first biasing member, wherein said tray separating device is operable to engage the first engaging portion of said individual tray and exert a force at the first engaging portion generally in a separating direction along the stack of trays; and a tilt mechanism positioned adjacent said tray supporting device, said tilt mechanism being operable to tilt a vertically oriented stack of trays onto said tray supporting device.

16. The tray destacking device of claim 15, wherein said tray supporting device is inclined and operable to move the stack of trays upward along the incline to a destacking position.

17. The tray destacking device of claim 16, wherein said separating direction defines a first angle with respect to horizontal and said tray supporting device defines a second angle with respect to horizontal, said first angle being greater than said second angle.

18. The tray destacking device of claim 17, wherein said tray separating device moves said individual tray from said tray supporting device, said tray separating device pivoting said individual tray to a generally upright orientation after said individual tray has been removed from said tray supporting device.

19. The tray destacking device of claim 1, wherein said tray separating device moves to said disengaging position to release said individual tray at a discharge end of said tray separating device.

20. A tray destacking device for destacking an individual tray from a stack of at least partially nested trays, the stack of trays defining a stack direction, each of the trays having a first engaging portion and a second engaging portion which are generally within respective planes that are generally normal to said stack direction, said tray destacking device comprising:

a tray supporting device for supporting a stack of at least two at least partially nested trays, said tray supporting device being inclined and supporting the stack of trays along an inclined support surface; and a tray separating device operable to separate and discharge individual trays from the stack of trays, said tray separating device being operable to engage the first engaging portion of an individual tray and to exert a separating force at the first engaging portion generally in said stack direction to remove the individual tray from the stack of trays.

21. The tray destacking device of claim 20 including a tray retaining device operable to engage the second engaging portion of a tray, said tray retaining device engaging the second engaging portion of a next tray adjacent to said individual tray to retain the remaining trays of the stack of trays when said tray separating device moves said individual tray generally in said stack direction.

22. The tray destacking device of claim 21, wherein said tray supporting device comprises a conveyor which is operable to move the stack of trays to a destacking position along said tray supporting device with respect to at least one of said tray separating device and said tray retaining device.

23. A tray destacking device for destacking an individual tray from a stack of at least partially nested trays, the stack of trays defining a stack direction, each of the trays having a first engaging portion and a second engaging portion which are generally within respective planes that are generally normal to said stack direction, said tray destacking device comprising:
- a tray supporting device for supporting a stack of at least two at least partially nested trays;
- a tray separating device operable to separate and discharge individual trays from the stack of trays, said tray separating device being operable to engage the first engaging portion of an individual tray and to exert a separating force at the first engaging portion generally in said stack direction to remove the individual tray from the stack of trays; and
- a tilt mechanism positioned adjacent to said tray supporting device, said tilt mechanism being operable to tilt a vertically oriented stack of trays onto said tray supporting device.

24. The tray destacking device of claim 23, wherein said tray supporting device is inclined and operable to move the stack of trays upward along the incline to said destacking position.

25. The tray destacking device of claim 20, wherein said tray separating device moves to disengage from the first engaging portion of said individual tray to release said individual tray at a discharge end of said tray separating device.

26. The tray destacking device of claim 20, wherein said tray separating device comprises at least one engaging member which is pivotable between said engaging position and said disengaging position.

27. The tray destacking device of claim 26, wherein said at least one engaging member moves along said tray separating device between said discharge end of said tray supporting device and a discharge end of said tray separating device.

28. The tray destacking device of claim 27, wherein said at least one engaging member comprises a camming surface for engaging an upper edge of the stack of trays to pivot said at least one engaging member to said disengaging position as said at least one engaging member moves toward a position generally aligned with said first engaging portion of said individual tray.

29. The tray destacking device of claim 28, wherein said at least one engaging member comprises an engaging surface, said at least one engaging member being biased to pivot said engaging surface into engagement with said first engaging portion by a first biasing member in response to said at least one engaging member arriving at said generally aligned position.

30. The tray destacking device of claim 29 including at least one retaining arm operable to retain the stack of trays on said tray supporting device as said at least one engaging member separates and removes said individual tray from the stack of trays.

31. The tray destacking device of claim 30, wherein said at least one retaining arm is pivotable between a retaining position wherein said at least one retaining arm engages and retains the stack of trays on said tray supporting device and a released position where said at least one retaining arm is disengaged from the stack of trays on said tray supporting device.

32. The tray destacking device of claim 31, wherein said at least one engaging member comprises a release member which is adapted to engage and pivot said at least one retaining arm toward said released position in response to said at least one engaging member moving toward said generally aligned position.

33. The tray destacking device of claim 32, wherein said at least one retaining arm is biased toward said retaining position by a second biasing member.

34. The tray destacking device of claim 33, wherein said second biasing member pivots said at least one retaining arm to said retaining position in response to said at least one engaging member and maid release member moving generally in said stack direction away from said at least one retaining arm.

35. A tray destacking device for destacking an individual tray from a stack of at least partially nested trays, each of the trays having a first engaging portion and a second engaging portion, said tray destacking device comprising:
- a tray supporting device for supporting a stack of at least two at least partially nested trays;
- a tray retaining device pivotable between a retaining position where said tray retaining device engages the first engaging portion of a tray of the stack of trays and a released position where said tray retaining device is remote from the first engaging portion of the trays supported by said tray supporting device; and
- a tray separating device operable to separate and discharge individual trays from the stack of trays, said tray separating device comprising at least one separating member which is pivotable between an engaging position for engaging the second engaging portion of an individual tray of the stack of trays and a disengaging position remote from the second engaging portion of the trays supported by said tray supporting device, said at least one separating member being operable to engage the second engaging portion of said individual tray and exert a force at the second engaging portion generally in a separating direction along the stack of trays, said tray retaining device pivoting to said retaining position to engage the first engaging portion of a next tray adjacent to said individual tray as said at least one separating member moves relative to and away from said tray retaining device in said separating direction, wherein said tray retaining device is pivotally mounted at said tray supporting device and said at least one separating member is movable along said tray separating device between said discharge end of said tray supporting device and a discharge end of said tray separating device.

36. The tray destacking device of claim 35, wherein said at least one separating member includes a camming surface for engaging an upper edge of the stack of trays to pivot said at least one separating member to said disengaging position as said at least one separating member moves toward a position generally aligned with said second engaging portion of said individual tray.

37. The tray destacking device of claim 36, wherein said at least one separating member includes an engaging surface, said at least one separating member being biased to pivot said engaging surface into engagement with said second engaging portion by a first biasing member in response to said at least one separating member arriving at said generally aligned position.

38. The tray destacking device of claim 37, wherein said at least one separating member includes a releasing member which is adapted to engage and pivot said tray retaining device toward said released position as said at least one separating member moves toward said generally aligned position.

39. The tray destacking device of claim 38, wherein said tray retaining device is biased toward said retaining position by a second biasing member.

40. The tray destacking device of claim 39, wherein said second biasing member pivots said tray retaining device to said retaining position in response to said at least one separating member and said releasing member moving relative to said tray retaining device in said separating direction.

41. The tray destacking device of claim 35, wherein said at least one separating member moves to engage the second engaging surface of said individual tray in a plane defined along the second engaging surface which is generally normal to said separating direction.

42. The tray destacking device of claim 41, wherein said tray retaining device moves to engage the first engaging surface of the nest adjacent tray in a second plane defined along the first engaging surface which is generally normal to said separating direction.

43. The tray destacking device of claim 35, wherein said tray supporting device comprises a conveyor which is operable to move the stack of trays to an aligned position along said tray supporting device with respect to at least one of said tray separating device and said tray retaining device.

44. A tray destacking device for destacking an individual tray from a stack of at least partially nested trays, each of the trays having a first engaging portion and a second engaging portion, said tray destacking device comprising:
a tray supporting device for supporting a stack of at least two at least partially nested trays;
a tray retaining device pivotable between a retaining position where said tray retaining device engages the first engaging portion of a tray of the stack of trays and a released position where said tray retaining device is remote from the first engaging portion of the trays supported by said tray supporting device;
a tray separating device operable to separate and discharge individual trays from the stack of trays, said tray separating device comprising at least one separating member which is pivotable between an engaging position for engaging the second engaging portion of an individual tray of the stack of trays and a disengaging position remote from the second engaging portion of the trays supported by said tray supporting device, said at least one separating member being operable to engage the second engaging portion of said individual tray and exert a force at the second engaging portion generally in a separating direction along the stack of trays, said tray retaining device being pivotable to said retaining position to engage the first engaging portion of a next tray adjacent to said individual tray in response to said at least one separating member moving relative to said tray retaining device in said separating direction, said tray supporting device comprising a conveyor which is operable to move the stack of trays to an aligned position along said tray supporting device with respect to at least one of said tray separating device and said tray retaining device; and
a tilt mechanism positioned adjacent said tray supporting device, said tilt mechanism being operable to tilt a vertically oriented stack of trays onto said tray supporting device.

45. The tray destacking device of claim 44, wherein said tray supporting device is inclined and operable to move the stack of trays upward along the incline to said aligned position.

46. The tray destacking device of claim 45, wherein said separation direction defines a first angle with respect to horizontal and said tray supporting device defines a second angle with respect to horizontal, said first angle being greater than said second angle.

47. The tray destacking device of claim 46, wherein said tray separating device moves said individual tray from said tray supporting device, said tray separating device pivoting said individual tray to a generally upright orientation after said individual tray has been removed from said tray supporting device.

48. The tray destacking device of claim 47, wherein said separating member moves along said tray separating device to said disengaging position to release said individual tray at a discharge end of said tray separating device.

49. A tray destacking device for destacking an individual tray from a stack of at least partially nested trays, each of the trays having a first engaging portion and a second engaging portion, said tray destacking device comprising:
a tray supporting device for supporting a stack of at least two at least partially nested trays;
a tray retaining device pivotable between a retaining position where said tray retaining device engages the first engaging portion of a tray of the stack of trays and a released position where said tray retaining device is remote from the first engaging portion of the trays supported by said tray supporting device; and
a tray separating device operable to separate and discharge individual trays from the stack of trays, said tray separating device comprising at least one separating member which is pivotable between an engaging position for engaging the second engaging portion of an individual tray of the stack of trays and a disengaging position remote from the second engaging portion of the trays supported by said tray supporting device, said at least one separating member being operable to engage the second engaging portion of said individual tray and exert a force at the second engaging portion generally in a separating direction along the stack of trays, said tray retaining device pivoting to said retaining position to engage the first engaging portion of a next tray adjacent to said individual tray as said at least one separating member moves relative to and away from said tray retaining device in said separating direction, wherein said tray supporting device is inclined and supports the stack of trays along an inclined support surface.

50. The tray destacking device of claim 49, wherein said inclined tray supporting device comprises an inclined conveyor that is operable to convey the stack of trays toward said tray separating device.

51. The tray destacking device of claim 49, wherein said inclined support surface is an a first angle relative to horizontal and said separating direction is at a second angle relative to horizontal.

52. The tray destacking device claim 51, wherein said second angle is greater than said first angle.

53. The tray destacking device of claim 1, wherein said inclined tray supporting device comprises an inclined conveyor that is operable to convey the stack of trays toward said tray separating device.

54. The tray destacking device of claim 1, wherein said inclined support surface is an a first angle relative to horizontal and said separating direction is at a second angle relative to horizontal.

55. The tray destacking device of claim 54, wherein said second angle is greater than said first angle.

56. The tray destacking device of claim 20, wherein said inclined tray supporting device comprises an inclined conveyor that is operable to convey the stack of trays toward said tray separating device.

57. The tray destacking device of claim 20, wherein said inclined support surface is an a first angle relative to horizontal and said tray separating device moves the individual tray along a second angle relative to horizontal.

58. The tray destacking device of claim 57, wherein said second angle is greater than said first angle.

* * * * *